United States Patent
Guo et al.

(10) Patent No.: US 9,924,438 B1
(45) Date of Patent: Mar. 20, 2018

(54) FREQUENCY ACQUISITION DURING ROAMING

(71) Applicant: Amazon Technologies, Inc., Seattle, WA (US)

(72) Inventors: Jin Guo, Cupertino, CA (US); Binh Quoc Tran, Los Altos, CA (US); Shengwei Zhang, Fremont, CA (US); Jay William Kruse, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 14/742,994

(22) Filed: Jun. 18, 2015

(51) Int. Cl.
| | |
|---|---|
| *H04B 7/00* | (2006.01) |
| *H04W 36/30* | (2009.01) |
| *H04W 72/08* | (2009.01) |
| *H04W 36/14* | (2009.01) |
| *H04W 76/04* | (2009.01) |
| *H04W 88/02* | (2009.01) |
| *H04W 88/08* | (2009.01) |
| *H04W 84/02* | (2009.01) |

(52) U.S. Cl.
CPC ........... *H04W 36/30* (2013.01); *H04W 36/14* (2013.01); *H04W 72/085* (2013.01); *H04W 76/04* (2013.01); *H04W 84/02* (2013.01); *H04W 88/02* (2013.01); *H04W 88/08* (2013.01)

(58) Field of Classification Search
CPC ..... H04W 28/16; H04W 28/20; H04W 28/22; H04W 36/06; H04W 36/14; H04W 36/32

USPC .......... 370/310, 328, 331–333, 465
See application file for complete search history.

(56) References Cited

U.S. PATENT DOCUMENTS

| | | | | |
|---|---|---|---|---|
| 8,374,100 | B2 * | 2/2013 | Stacey ................. | H04W 24/00 370/252 |
| 8,711,748 | B2 * | 4/2014 | Seok .................... | H04W 36/06 370/311 |
| 8,971,922 | B2 * | 3/2015 | Lim ..................... | H04W 4/023 455/12.1 |
| 9,386,496 | B2 * | 7/2016 | Gupta .................. | H04W 36/22 |
| 9,426,729 | B2 * | 8/2016 | Pazhyannur ......... | H04W 48/18 |
| 9,497,680 | B1 * | 11/2016 | Tran .................... | H04W 36/14 |
| 2005/0064866 | A1 * | 3/2005 | Sun ...................... | H04W 36/14 455/426.1 |
| 2006/0073827 | A1 * | 4/2006 | Vaisanen ............. | H04W 36/0055 455/436 |
| 2015/0350993 | A1 * | 12/2015 | Kasten ................. | H04W 48/16 370/332 |
| 2016/0338059 | A1 * | 11/2016 | Huang ................. | H04W 72/0453 |

\* cited by examiner

*Primary Examiner* — Dmitry H Levitan
(74) *Attorney, Agent, or Firm* — Pierce Atwood LLP

(57) ABSTRACT

Devices, systems and methods are disclosed for allowing a mobile device to roam from a first frequency band to a second frequency band for a dual band access point when a signal strength associated with the first frequency band improves. For example, the mobile device may store a first signal strength associated with the first frequency band when the mobile device first connects to the first frequency band and may monitor subsequent signal strengths to determine if they exceed the first signal strength. When a subsequent signal strength exceeds the first signal strength, the mobile device may use this as an indication that the mobile device is closer to the access point and within range of the second frequency band. The mobile device may then detect and connect to the second frequency band.

19 Claims, 19 Drawing Sheets

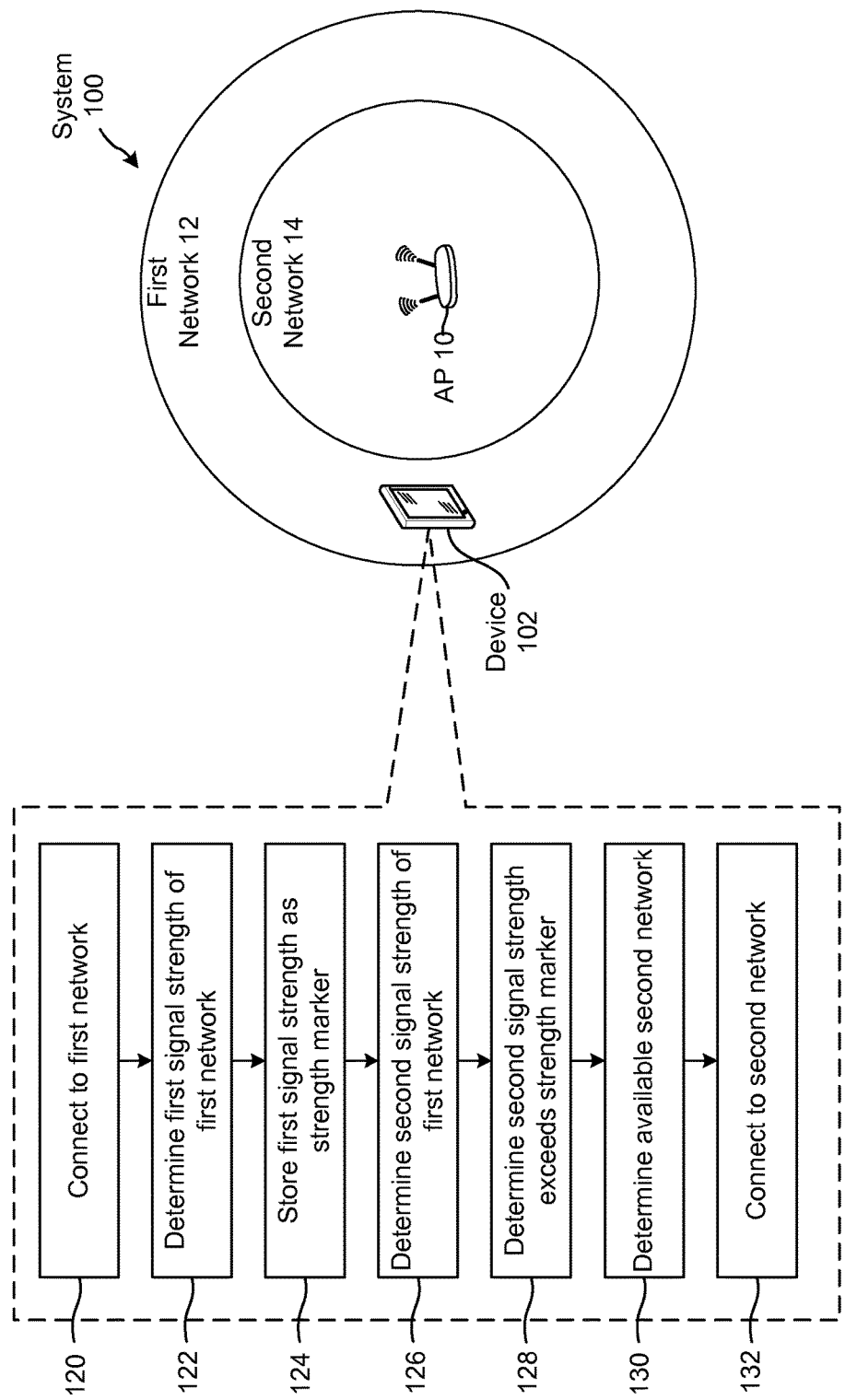

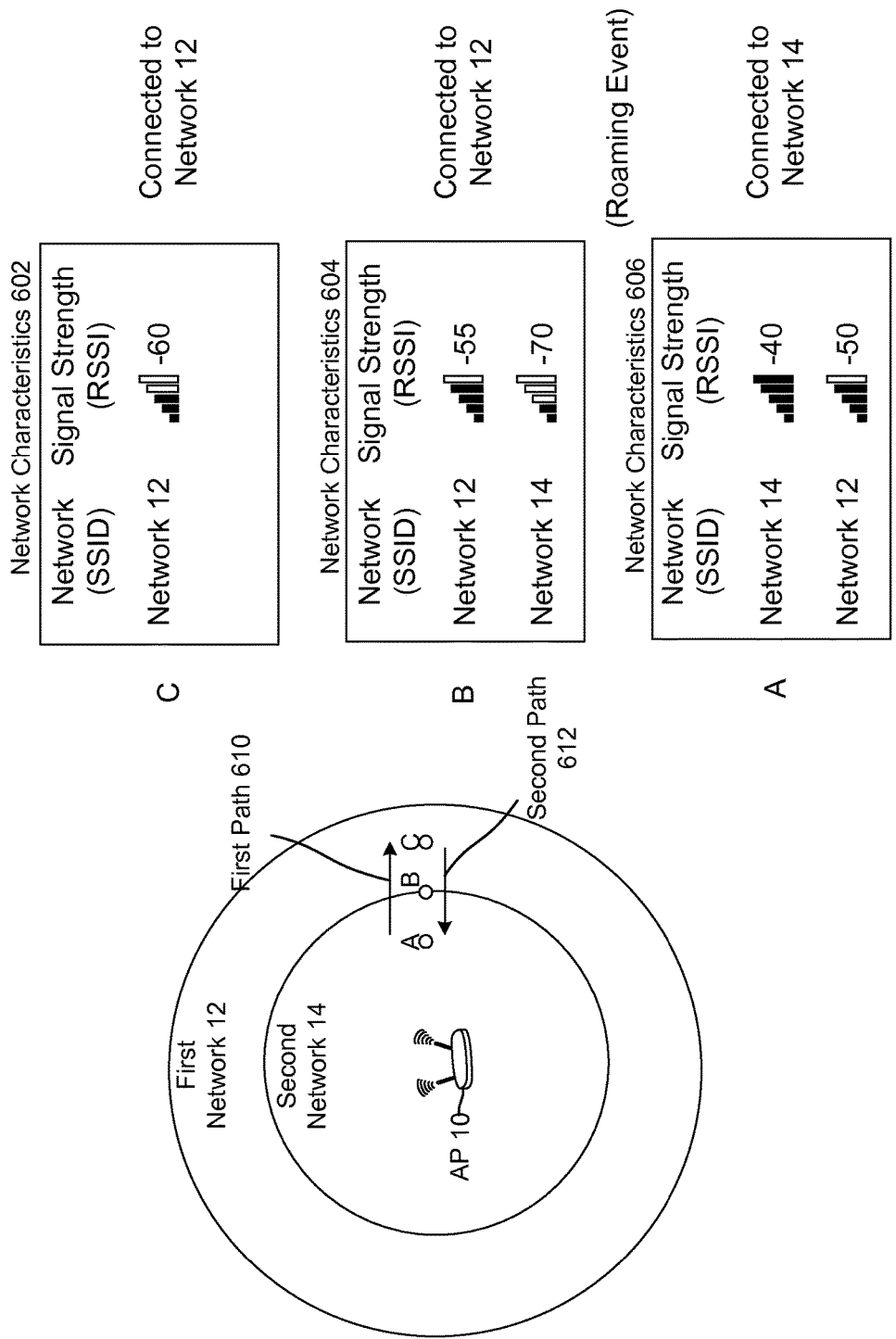

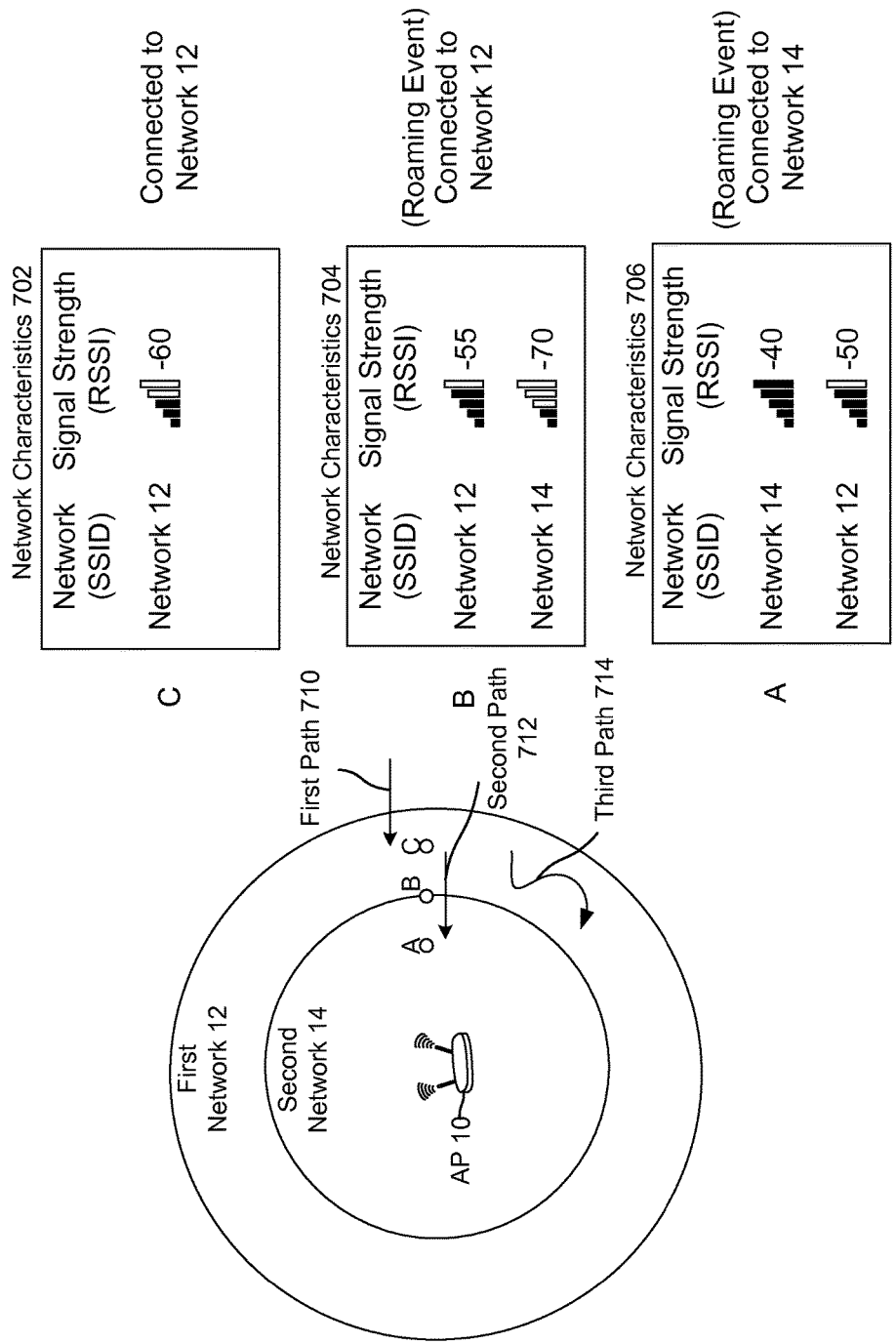

FREQUENCY ACQUISITION DURING ROAMING

BACKGROUND

With the advancement of technology, the use and popularity of electronic devices has increased considerably. Electronic devices are commonly used to wirelessly connect to networks using network devices such as access points. Typically, electronic devices monitor signal strengths associated with the network devices to determine with which network device to connect. Due to differences in data rates between different networks, techniques are required for monitoring signal quality metrics associated with the network devices to determine with which network device to connect.

BRIEF DESCRIPTION OF DRAWINGS

For a more complete understanding of the present disclosure, reference is now made to the following description taken in conjunction with the accompanying drawings.

FIGS. 1A-1B illustrate overviews of systems for connecting to networks according to embodiments of the present disclosure.

FIGS. 6A-6B illustrate an example and a flowchart conceptually illustrating an example method for triggering a roaming event while traveling away from and back towards an access point according to embodiments of the present disclosure.

FIGS. 7A-7B illustrate an example and a flowchart conceptually illustrating an example method for storing and updating a signal quality marker while traveling towards an access point according to embodiments of the present disclosure.

DETAILED DESCRIPTION

Figure 1B:
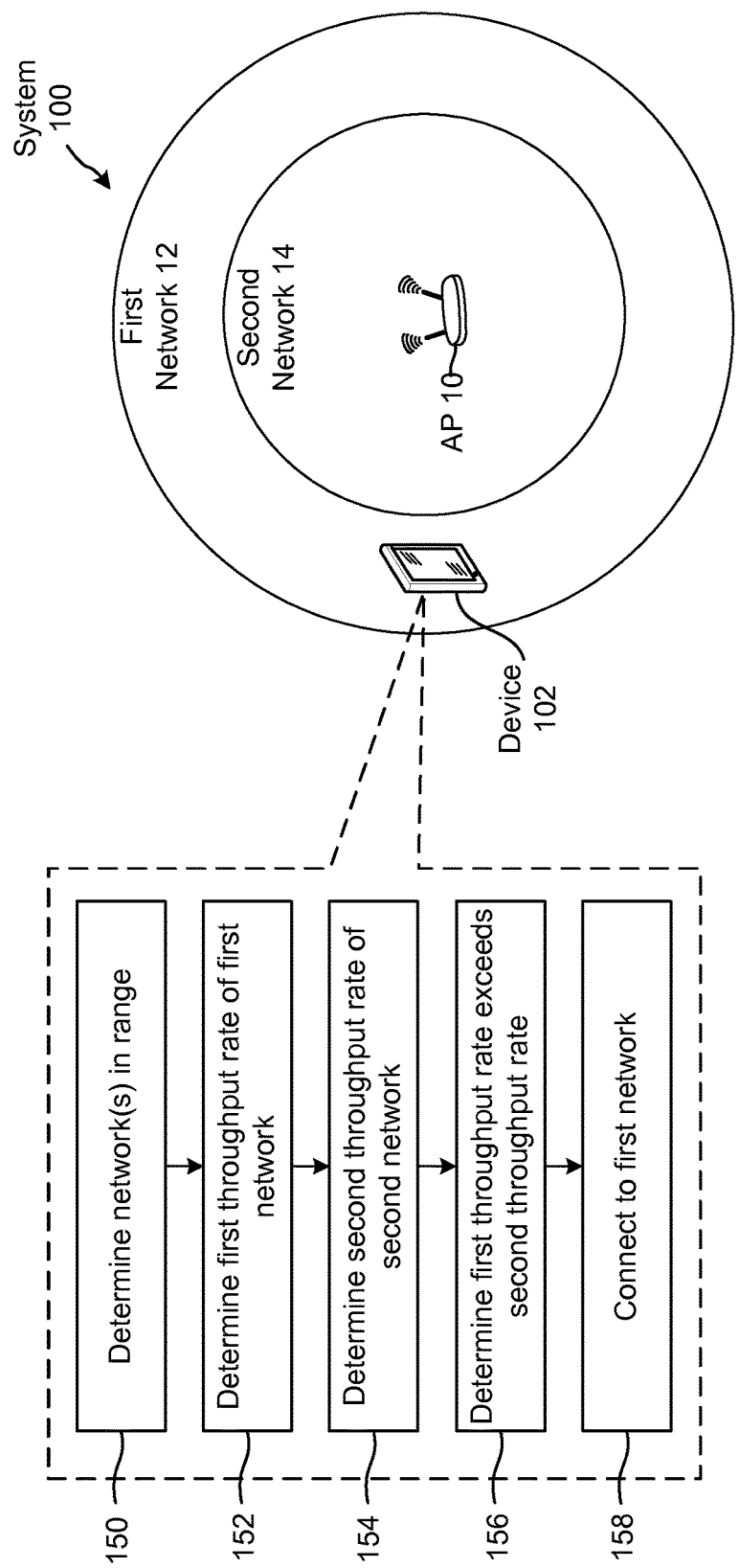

Electronic devices are commonly used to connect to wireless networks using network devices such as access points. Typically, electronic devices monitor signal strengths associated with specific frequencies to determine with which frequency and/or network to connect. For example, a mobile device may connect to a network having a highest signal strength of available networks and may monitor a signal strength of the network to determine whether to perform a roaming event and connect to a different network. Thus, the mobile device relies on signal degradation of the current network to trigger a roaming event and connect to a different network. A roaming event occurs when the mobile device detects available networks and determines whether to remain connected to the current network or connect to a different network. Until a roaming event is triggered, the mobile device may remain connected to the current network even though alternative networks are available. The roaming event may involve a detection/scan of available networks and their respective signal strengths. The roaming event may also include a switch to a detected network.

Certain network devices, however, may allow devices to connect to different frequencies and/or networks on multiple frequency bands, for example operating two frequency bands in a dual band topology. For example, a network device may operate a first network (e.g., a 2.4 GHz frequency band WiFi signal) with an extended range at a low data rate and broadcast a second network (e.g., a 5 GHz frequency band WiFi signal) with a limited range at a high data rate. As a result of relying on signal degradation to determine whether to switch between networks, a mobile device may remain connected to the first network even after moving into range of the second network having the high data rate.

To improve wireless communication performance of a mobile device, devices, systems and methods are disclosed that trigger the device to connect to an available network associated with a higher data rate. As an example, the device may store a signal quality metric value associated with a first network as a metric marker and may trigger a roaming event (i.e., switch from the first, low data rate, network to the second, higher data rate, network) when the signal quality metric value associated with the first network exceeds the metric marker. For example, when the mobile device travels toward the network device and a signal strength of the first network improves, the mobile device may determine that the signal strength improved and may trigger a roaming event to determine if a second network is available. As another example, the device may select a network and trigger roaming events based on data rates associated with available networks. For example, when the device travels toward the network device and the second network having a high data rate becomes available, the device may trigger a roaming event and connect to the second network.

FIG. 1A illustrates an overview of a system 100 for implementing embodiments of the disclosure. The system 100 includes a mobile device 102 connecting to a network device (also referred to as an access point (AP)) 10 via a wireless network. A connection between the mobile device 102 and the network device may be referred to as a communication link. As illustrated in FIG. 1A, the AP 10 is a dual band access point with a first network 12 associated with a first frequency (e.g., a 2.4 GHz frequency band) and a second network 14 associated with a second frequency (e.g., a 5 GHz frequency band). For ease of explanation, the disclosure will associate the first frequency with the first network and associate the second frequency with the second network to differentiate between the two frequency bands. However, the first frequency and the second frequency may be associated with a single network and the device 102 may connect to the single network using either frequency band without departing from the disclosure. While the examples above mention 2.4 GHz/5 GHz frequency bands, the present disclosure is not limited thereto and the frequency bands may vary. Further, while the AP 10 may be a dual band access point, the present disclosure is not limited thereto and the first network 12 may be associated with a first AP 10-1 and the second network 14 may be associated with a second AP 10-2 without departing from the disclosure.

Current roaming algorithms typically rely on the degradation of a received signal strength indication (RSSI) value of a signal from the AP 10 to trigger a roaming event on the device. This methodology may have worked well in a single band topology, but such a roaming algorithm may not necessarily maximize data throughput available in a dual band topology. This is due to different characteristics of the two frequency bands associated with the AP 10. For example, the first network 12 offers an extended range compared to the second network 14, but the second network 14 may offer higher data rates than the first network 12. Thus, when the device 102 travels outside of a range of the second network 14, the device 102 may improve a connection quality by disconnecting from the second network 14 and connecting to the first network 12. Similarly, when the device 102 is connected to the first network 12 and travels within the range of the second network 14, the device may improve a connection quality by disconnecting from the first network 12 and connecting to the second network 14 despite a good signal strength of the first network 12, as the second network 14 offers higher data rates.

Figure 3:
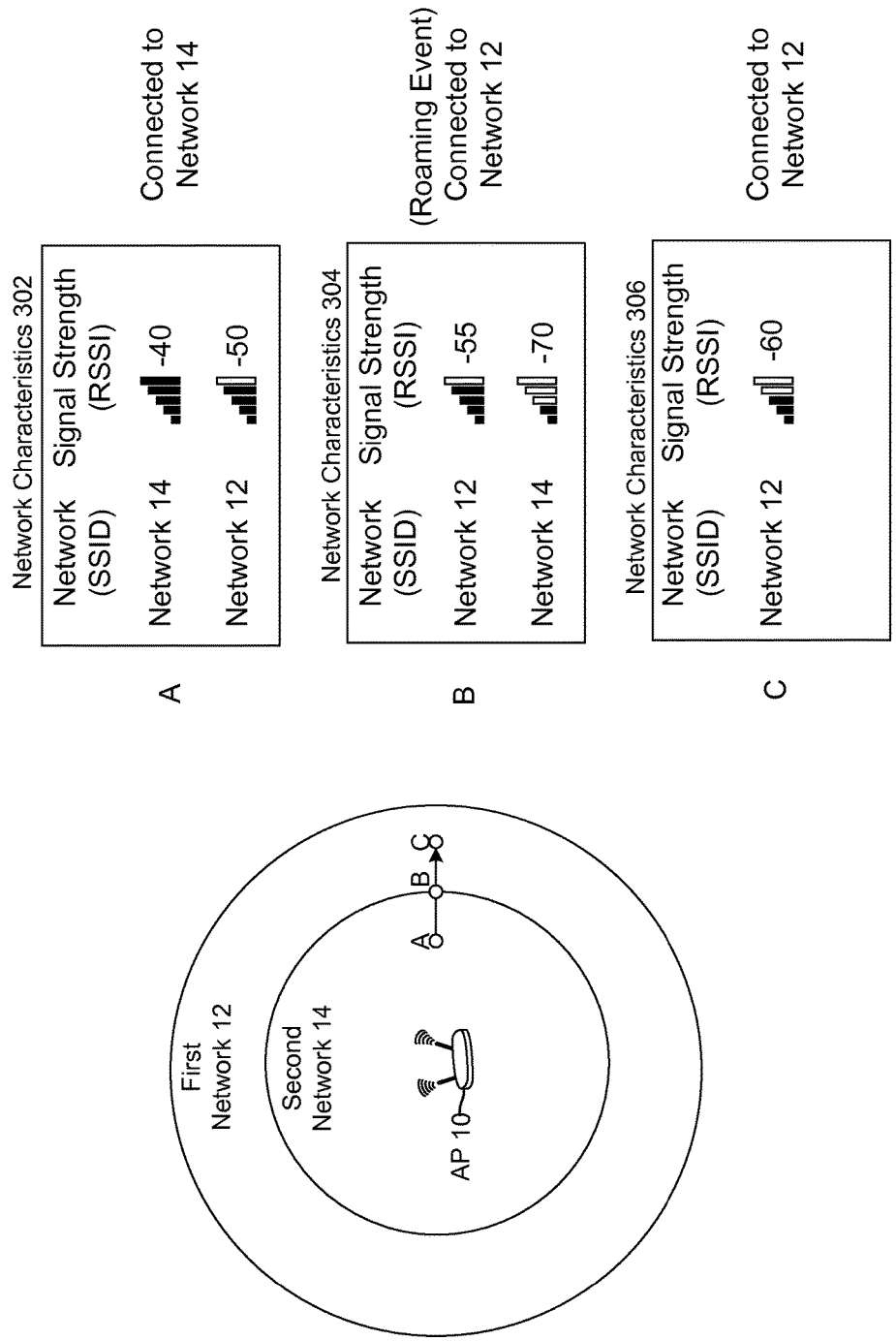
FIG. 3 illustrates an example of a device monitoring signal strengths while traveling away from an access point.
Figure 4:
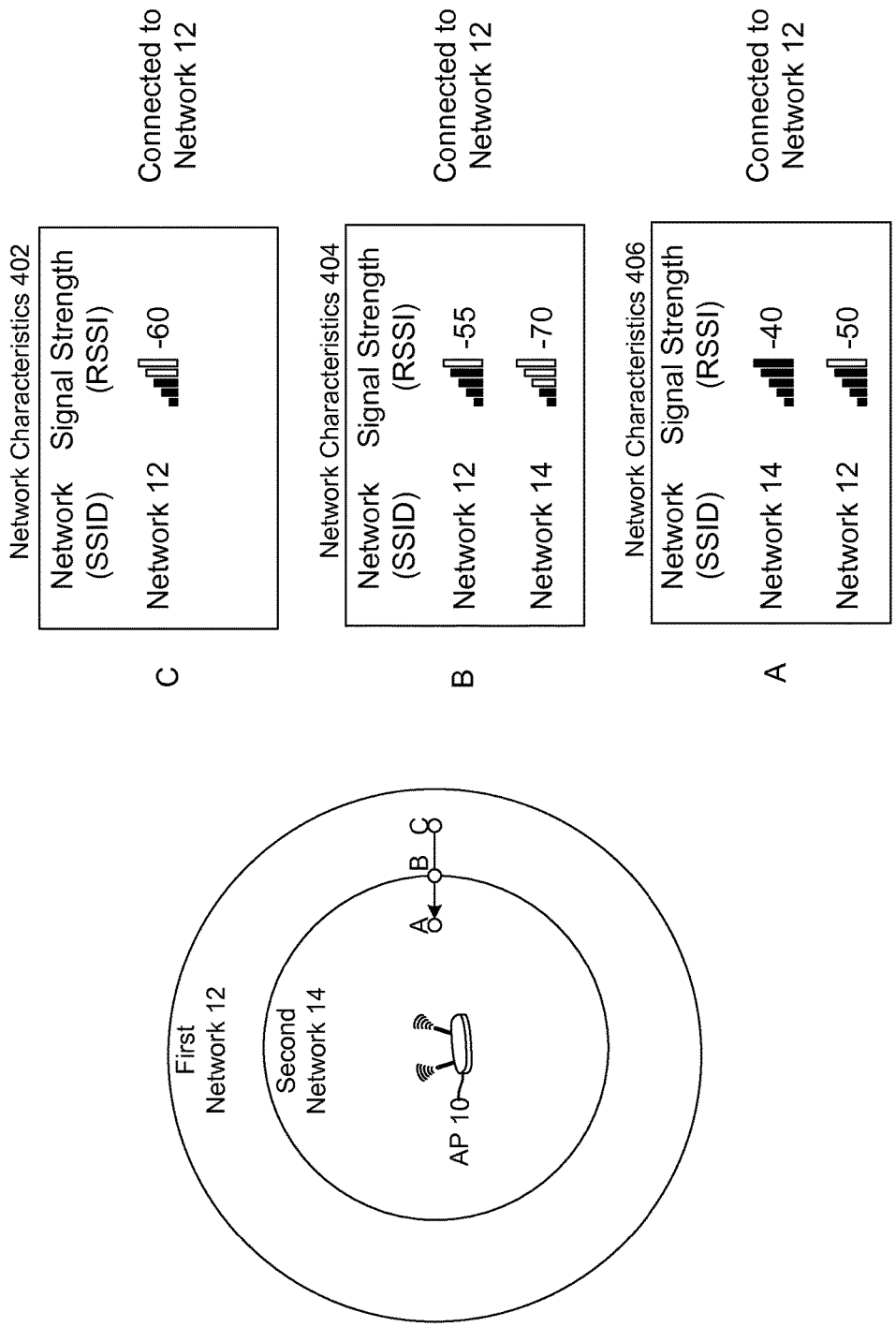
FIG. 4 illustrates an example of a device monitoring signal strengths while traveling towards an access point.

Due to the different characteristics of the two frequency bands, a first RSSI value associated with the first network 12 may be higher than a second RSSI value associated with the second network 14 at a fixed location relative to the AP 10. For example, at a fixed reference distance from the AP 10 the device 102 may determine that the first RSSI value exceeds the second RSSI value by a first difference. To prioritize connecting to the AP 10 using the second network 14, the device 102 may add a preference value greater than the first difference to the second RSSI value when comparing the second RSSI value to the first RSSI value. For example, if the device 102 determines that the first RSSI value is −60 dBm and the second RSSI value is −80 dBm at the reference distance, the device 102 may determine that the first difference is 20 dBm and may assign a preference value of 25 dBm to the second network 14. The preference value of 25 dBm results in a preferred second RSSI value of −55 dBm and the additional 5 dBm above the first difference is added so that the device 102 selects the second network 14 at the reference distance. As illustrated in FIGS. 3-4 and 6 and associated descriptions, the device 102 may compare the first RSSI value to the preferred second RSSI value to determine with which network to connect.

The device 102 may connect (120) to the first network 12. For example, the device 102 may have been previously within range of the first network 12 but connected to the second network 14, such as when the device 102 travels in a direction away from the AP 10 (e.g., just outside the inner circle associated with the second network 14), or the device 102 may have been previously outside the range of the first network 12, such as when the device 102 travels in a direction towards the AP 10 (e.g., just inside the outer circle associated with the first network 12).

The device 102 may determine (122) a first signal strength associated with the first network 12 and may store (124) the first signal strength as a strength marker. For example, the device 102 may determine the signal strength associated with the first network 12 prior to connecting to the first network 12 and may store that signal strength as the strength marker for future comparison. Alternatively, the device 102 may be connected to the first network 12 and may determine the first signal strength and store the first signal strength as the strength marker. Thus, in some examples the device 102 may remember the signal strength associated with the first network 12 at the point the device switches from the second network 14 to the first network 12 (due to declining signal strength associated with the second network 14). In other examples, the device 102 may remember the signal strength associated with the first network 12 at the point the device first enters the first network 12 from outside the first network 12.

At a later time, when the device 102 is connected to the first network 12 but travels within range of the second network 14, the device 102 may determine (126) a second signal strength associated with the first network 12 and may compare that second signal strength to the stored strength marker. For example, the device 102 may periodically determine the signal strength associated with the first network 12 as the device 102 travels towards the AP 10. As the device 102 gets closer to the AP 10, a signal strength associated with the first network 12 may improve. The device 102 may use an improvement in the signal strength as an indicator that the device 102 may be within range of the second network 14. At some point, the device may determine (128) that the second signal strength exceeds the strength marker. Therefore, when the second signal strength exceeds the strength marker, the device 102 may determine (130) that the second network is available and may connect (132) to the second network 14. This technique may be discussed in greater detail below with regard to FIGS. 5-7.

FIG. 1B illustrates an overview of a system 100 for implementing embodiments of the disclosure. The system 100 includes a device 102 connecting to an access point (AP) 10 via a wireless network. A connection between the mobile device 102 and the network device may be referred to as a communication link. As illustrated in FIG. 1B, the AP 10 is a dual band access point with a first network 12 associated with a first frequency (e.g., 2.4 GHz frequency band) and a second network 14 associated with a second frequency (e.g., 5 GHz frequency band). While the examples above mention 2.4 GHz/5 GHz frequency bands, the present disclosure is not limited thereto and the frequency bands of each network may vary.

The device 102 may determine (150) network(s) in range. For example, the device 102 may monitor particular frequency ranges and detect messages from the access point 10 identifying the available first and second networks. The device 102 may determine (152) a first throughput rate of a first network, may determine (154) a second throughput rate of a second network, may determine (156) that the first throughput rate exceeds the second throughput rate and may connect (158) to the first network. The throughput rate is the data rate at which the device 102 actually communicates with the AP 10, and may be monitored using both the transmit (Tx) and receive (Rx) data paths. The throughput rate may be determined based on a physical layer (PHY)

data rate, which is a maximum data rate at which the device 102 and the AP 10 may communicate, or the like. By comparing the throughput rates, the device 102 may improve a performance by connecting to a network having the highest data rate available. This technique is discussed in greater detail below with regard to FIGS. 8A-13B.

Figure 2A:
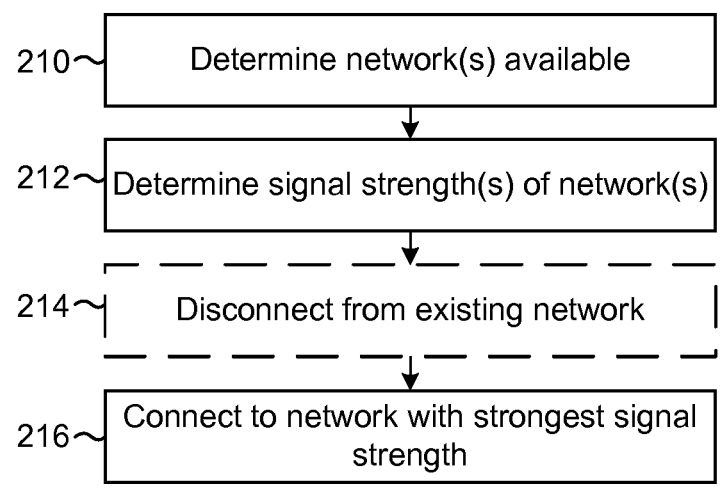
FIGS. 2A-2B are flowcharts conceptually illustrating example methods for connecting to networks and triggering roaming events using signal strengths.
Figure 2B:
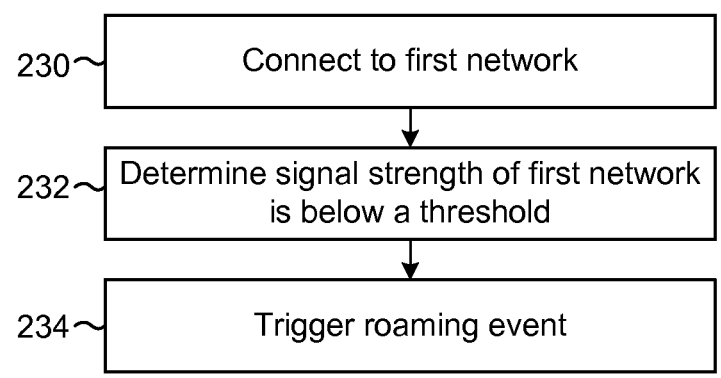

Typically, devices trigger a roaming event and connect to a network during the roaming event based on signal strengths, as illustrated in FIGS. 2A-2C. For example, as shown in FIG. 2A, a device may determine (210) network(s) available, determine (212) signal strength(s) of the network(s), may optionally disconnect (214) from an existing network and may connect (216) instead to a network with a strongest signal strength of the available network(s). Thus, the device chooses between the available networks based exclusively on signal strength, without regard to data rates or other signal quality metrics.

Further, as shown in FIG. 2B, the device may trigger a roaming event using roaming algorithms based on a signal strength of a network with which the device is currently connected. For example, the device may connect (230) to a first network, determine (232) a signal strength associated with the first network is below a threshold and may trigger (234) a roaming event.

FIG. 3 illustrates an example of a device monitoring signal strengths while traveling away from an access point. While FIG. 3 illustrates network characteristics associated with the first network 12 and the second network 14 at each of location A, location B and location C, this is intended for illustrative purposes only and a mobile device may not detect the network characteristics associated with each available network at each of the locations. For example, when the mobile device is connected to the second network 14, typically the mobile device does not detect network characteristics associated with other available networks (e.g., first network 12) until a roaming event is triggered.

When the mobile device is at a first location A within range of the first network 12 and the second network 14, the device may detect network characteristics 302. As illustrated in FIG. 3, the network characteristics 302 may include a network identifier (e.g., service set identifier (SSID)) and a signal strength (e.g., RSSI value). As a signal strength associated with the second network 14 (e.g., −40 dBm) is higher than a signal strength associated with the first network 12 (e.g., −50 dBm), the device may connect to the second network 14. As discussed above, due to the different characteristics of the two frequency bands associated with the first network 12 and the second network 14, a first RSSI value associated with the first network 12 may be higher than a second RSSI value associated with the second network 14 at a fixed distance. To prioritize connecting to the AP 10 using the second network 14, the device 102 may add a preference value to the second RSSI value when comparing the second RSSI value to the first RSSI value. For example, at location A the device 102 may determine the first RSSI value associated with the first network 12 to be −50 dBm and the second RSSI value associated with the second network 14 to be −60 dBm. However, the device 102 may add a fixed preference value (e.g., 20 dBm) to the second RSSI value to result in the RSSI value of −40 dBm illustrated in FIG. 3. Therefore, FIGS. 3-4 illustrates RSSI values associated with the second network 14 as including the preference value.

However, a signal strength associated with the second network 14 may fade as the device travels away from the AP 10. For example, the device may detect network characteristics 304 at a second location B along a boundary of the second network 14. As a signal strength associated with the second network (e.g., −70 dBm) is below a threshold, the device may trigger a roaming event and may determine to connect to the first network 12, which has a strongest signal strength (e.g., −55 dBm) of the available networks. As the device travels further away from the AP 10, a signal strength associated with the second network 14 may fade such so that the device may not detect the second network 14. For example, the device may detect network characteristics 306 at a third location C outside the range of the second network 14 and may remain connected to the first network 12. As illustrated in FIG. 3, current roaming algorithms based on signal strength may generally function properly when the device travels away from the AP 10. Such algorithms, however, may encounter problems when the device moves back toward the AP 10.

In contrast to FIG. 3, FIG. 4 illustrates an example of a device monitoring signal strengths while traveling towards an access point. As illustrated in FIG. 4, current roaming algorithms do not maximize data throughput available as the device remains connected to the first network 12 despite the second network 14 being available with higher data rates. While FIG. 4 illustrates network characteristics associated with the first network 12 and the second network 14 at each of location A, location B and location C, this is intended for illustrative purposes only and the mobile device may not detect the network characteristics associated with each available network at each of the locations. For example, when the mobile device is connected to the first network 12, typically the mobile device does not detect network characteristics associated with other available networks (e.g., second network 14) until a roaming event is triggered.

At a first location C outside a range of the second network 14, the device may detect network characteristics 402 and may connect to the first network 12 as the first network 12 has a strongest signal strength (e.g., −60 dBm) of available networks. As the device travels towards the AP 10, a signal strength associated with the first network 12 continues to improve and the device remains connected to the first network 12. For example, at a second location B the device detects network characteristics 404 and remains connected to the first network 12, as a signal strength associated with the first network 12 does not drop below a threshold. Finally, at a third location A within range of both the first network 12 and the second network 14, the device remains connected to the first network 12 as the signal strength associated with the first network 12 does not drop below the threshold. Thus, current roaming algorithms only trigger a roaming event when disconnecting from a current network due to a degradation in signal strength associated with the current network. Therefore, as illustrated in FIG. 4, current roaming algorithms do not take into account data throughput and do not trigger a roaming event when a signal strength of an existing network is improving.

Figure 5:
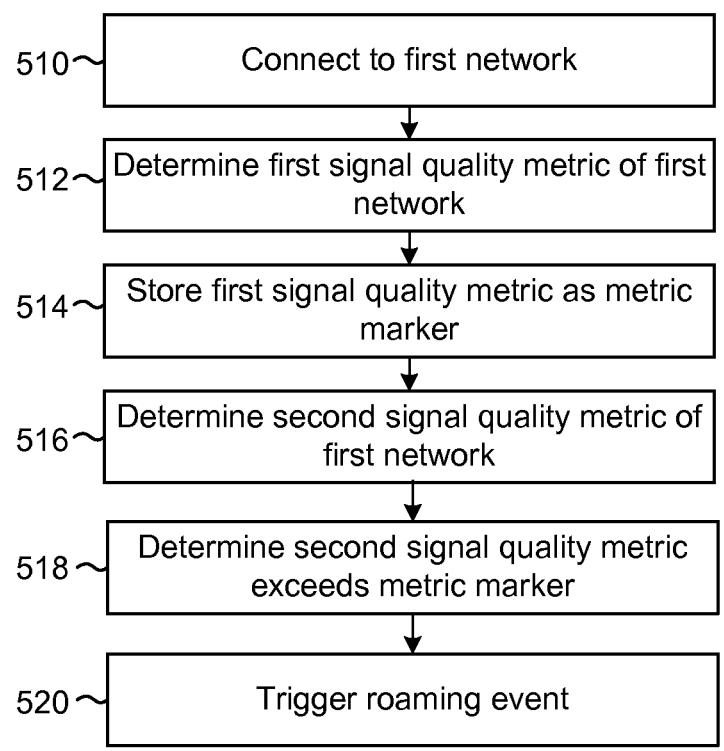
FIG. 5 is a flowchart conceptually illustrating an example method for triggering a roaming event based on a signal quality metric improving according to embodiments of the present disclosure.
Figure 6B:
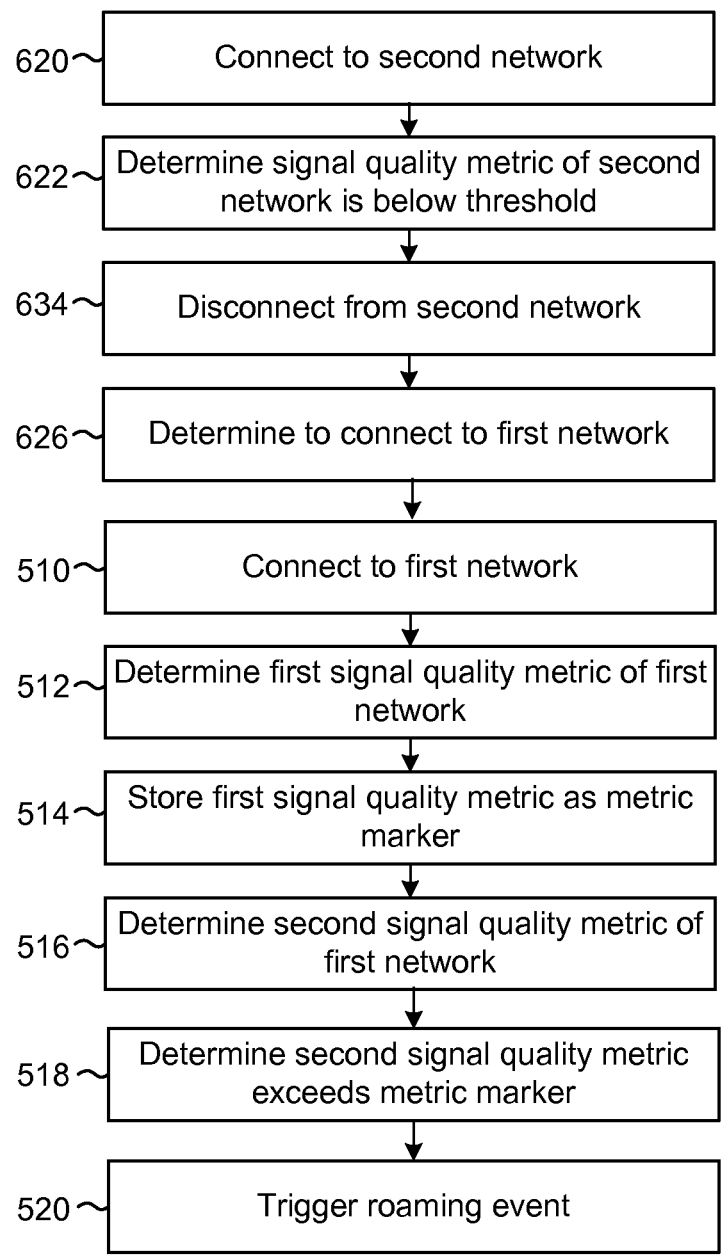
Figure 7B:
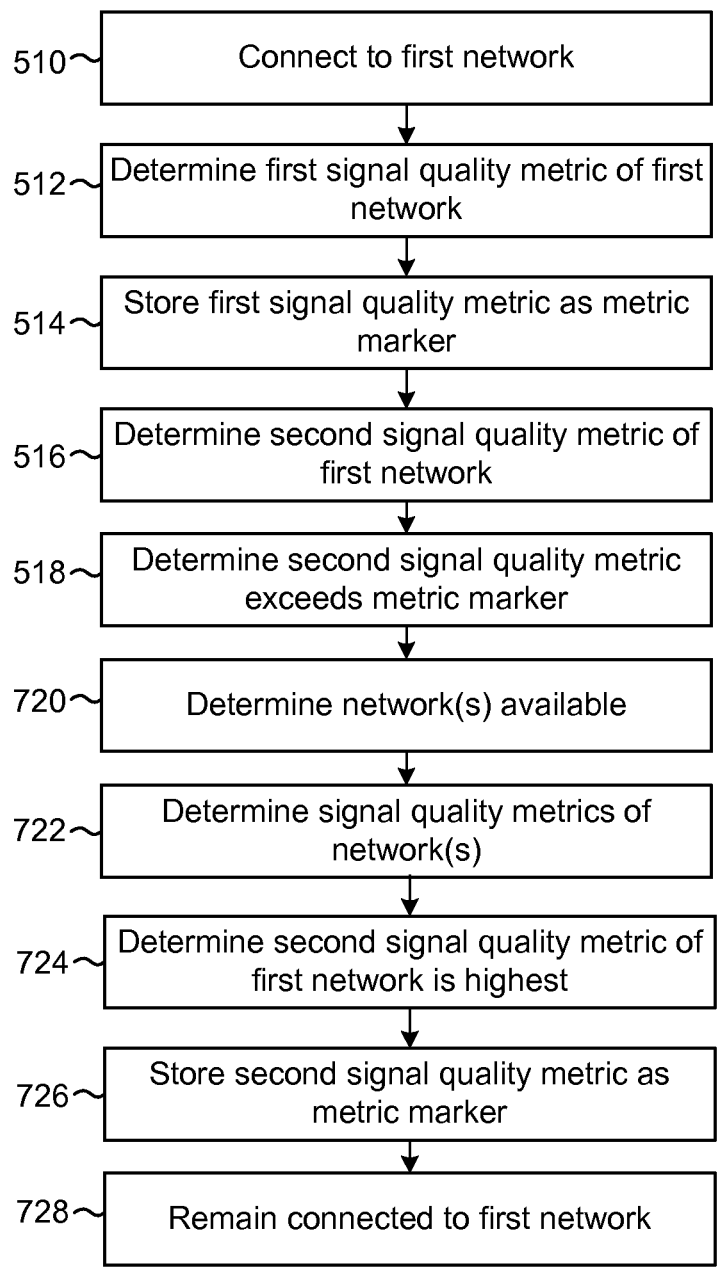

To improve a data throughput of the device, a roaming algorithm may be configured for a dual band topology and may use a signal quality metric of an existing network to indicate whether another network with increased data rates may be available. FIGS. 5, 6B and 7B are flowcharts conceptually illustrating example methods for triggering roaming events based on a signal quality metric value improving according to embodiments of the present disclosure.

Examples of signal quality metrics include metrics that indicate a transmission quality of a link between the device 102 and the AP 10. Not all signal quality metrics are supported by all access points, but the signal quality metrics may include transmit (Tx) statistics or receive (Rx) statistics or may be derivable from the Tx/Rx statistics. For example, Tx statistics may include retries count, multiple retries count, TX frame count, TX frame queued count, TX byte count, TX byte queued count, TX rate, TX rate history, Receive Success Rate (RTS) fail count, RTS success count, Acknowledgment (ACK) fail count or the like, Rx statistics may include current RSSI values, an average RSSI value, RX frame count, RX duplicated frame count, RX cyclic redundancy check (CRC) error count, RX rate, RX rate history, SYNC fail count or the like, and derivable statistics may include Packet Error Rate (PER), Bit Error Rate (BER), Signal to Noise Ratio (SNR) or the like. Several of the signal quality metrics listed above are associated with errors that occur when the device 102 transmits a data packet and the AP 10 does not receive the data packet. As the AP 10 does not receive the data packet, the device 102 must retransmit the data packet until the AP 10 receives the data packet. Therefore, while a data rate between the device 102 and the AP 10 may be high, a high number of errors (e.g., high error rate such as PER, BER, etc.) requires redundant transmissions of data packets, resulting in a lower actual throughput of unique data packets.

As illustrated in FIG. 5, the device 102 may connect (510) to a first network, may determine (512) a first signal quality metric value associated with the first network and may store (514) the first signal quality metric value as a metric marker. For example, the device 102 may determine that a first signal quality metric value (e.g., RSSI value or the like, although the present disclosure is not limited thereto) associated with the first network 12 is a highest signal quality metric of available networks, may connect to the first network 12 and may store the first signal quality metric value as the metric marker. The stored first signal quality metric value may correspond to a time when the device 102 acquires or connects to the first network 12.

Thereafter, the device 102 may compare signal quality metrics associated with the first network 12 to the metric marker to determine when the device 102 is approaching the AP 10 and therefore additional networks may become available. For example, the device 102 may determine (516) a second signal quality metric value associated with the first network, may determine (518) the second signal quality metric value exceeds the metric marker and may trigger (520) a roaming event. As a result of the roaming event, the device 102 may search for and determine available network(s) and may connect to an available network having the strongest signal quality metric value (e.g., RSSI value or the like). For example, the device 102 may determine that the first network 12 has the highest signal quality metric value available and remain connected to the first network 12. Alternatively, the device 102 may determine that the second network 14 is available and has the highest signal quality metric value available and may connect to the second network 14.

FIG. 6A illustrates an example of a device triggering a roaming event while traveling away from and back towards an access point according to embodiments of the present disclosure. Using the example method illustrated in FIGS. 5 and/or 6B, the device 102 may maximize data throughput available by connecting to the second network 14 even when a signal strength associated with the first network 12 improves. As discussed above, due to the different characteristics of the two frequency bands associated with the first network 12 and the second network 14, a first RSSI value associated with the first network 12 may be higher than a second RSSI value associated with the second network 14 at a fixed distance. To prioritize connecting to the AP 10 using the second network 14, the device 102 may add a preference value to the second RSSI value when comparing the second RSSI value to the first RSSI value. For example, at location A the device 102 may determine the first RSSI value associated with the first network 12 to be −50 dBm and the second RSSI value associated with the second network 14 to be −60 dBm. However, the device 102 may add a fixed preference value (e.g., 20 dBm) to the second RSSI value to result in the RSSI value of −40 dBm illustrated in FIG. 6A. Therefore, FIG. 6A illustrates RSSI values associated with the second network 14 as including the preference value.

While FIG. 6A illustrates network characteristics associated with the first network 12 and the second network 14 at each of location A, location B and location C, this is intended for illustrative purposes only and the device 102 may not detect the network characteristics associated with each available network at each of the locations. For example, when the device 102 is connected to the first network 12, typically the device 102 does not detect network characteristics associated with other available networks (e.g., second network 14) until a roaming event is triggered. However, the present disclosure is not limited thereto.

As illustrated in FIG. 6A, the device 102 may be connected to the second network 14 prior to traveling on a first path 610 from location A to location C. Due to signal degradation associated with the second network 14 along the first path 610, the device 102 may determine to connect to the first network 12 at location B, as discussed in greater detail above with regard to FIG. 3. Upon connecting to the first network 12, the device 102 may determine a first signal quality metric value associated with the first network 12 at location B and store the first signal quality metric value as the metric marker. When the device 102 travels along a second path 612 from location C to location A, the device 102 may monitor the signal quality metric associated with the first network 12 and determine that the device 102 is closer to the AP 10 than location B when the signal quality metric exceeds the metric marker.

For example, the device 102 may be connected to the second network 14 at location A and may travel along the first path 610 to location B. At location B, the device 102 may determine that the RSSI value associated with the second network 14 (e.g., −70 dBm) is below a threshold and may trigger a roaming event looking for an available network with a stronger signal. The device 102 may detect network characteristics 604 at location B, determine that the RSSI value associated with the first network 12 (e.g., −55 dBm) is the strongest available signal and may connect to the first network 12. The device 102 may store the RSSI value associated with the first network 12 at location B (e.g., −55 dBm) as the metric marker. In this example, the device 102 may monitor a signal strength associated with the first network 12 and compare the signal strength to the metric marker to determine if the device 102 is closer to the AP 10 than location B, at which point the device 102 may trigger a roaming event to determine if a signal strength associated with the second network 14 exceeds a signal strength associated with the first network 12.

As the device 102 continues along the first path 610 away from the AP 10, the device 102 may determine the RSSI value associated with the first network 12 is above the threshold (e.g., strong enough to remain connected to) and below the metric marker and may therefore remain connected to the first network 12. For example, at location C the device 102 may determine that the RSSI value associated with the first network is −60 dBm, which is below the metric marker (e.g., −55 dBm) but above the threshold.

As the device 102 travels along the second path 612 towards the AP 10, the device 102 may monitor the RSSI value associated with the first network 12 and compare the RSSI value to the metric marker. When an RSSI value associated with the first network 12 exceeds the metric marker (e.g., −55 dBm), the device 102 may trigger a roaming event and detect network characteristics. For example, at location B the device 102 may determine that the RSSI value associated with the first network 12 (e.g., −55 dBm) exceeds the metric marker (e.g., −55 dBm) and may detect network characteristics 604. However, the device 102 may determine that the RSSI value associated with the first network 12 (e.g., −55 dBm) exceeds the RSSI value of available networks (e.g., −70 dBm) and remain connected to the first network 12. However, at location A the device 102 may determine that the RSSI value associated with the first network 12 (e.g., −50 dBm) exceeds the metric marker (e.g., −55 dBm) and may detect network characteristics 606. Therefore, the device 102 may determine that the RSSI value associated with the second network 14 (e.g., −40 dBm) exceeds the RSSI value associated with the first network 12 (e.g., −50 dBm) and may connect to the second network 14.

FIG. 6B is a flowchart conceptually illustrating an example method for triggering a roaming event while traveling away from and back towards an access point according to embodiments of the present disclosure. As illustrated in FIG. 6B, the device 102 may connect (620) to a second network, determine (622) that a signal quality metric of the second network is below a threshold, disconnect (624) from the second network and determine (626) to connect to the first network. Thereafter, the device 102 may connect (510) to the first network, determine (512) a first signal quality metric value associated with the first network, store (514) the first signal quality metric value as the metric marker, determine (516) a second signal quality metric value associated with the first network, determine (518) that the second signal quality metric value exceeds the metric marker and trigger (520) a roaming event as discussed above with regard to FIG. 5.

FIG. 7A illustrates an example of a device storing and updating a signal quality marker while traveling towards an access point according to embodiments of the present disclosure. As discussed above, due to the different characteristics of the two frequency bands associated with the first network 12 and the second network 14, a first RSSI value associated with the first network 12 may be higher than a second RSSI value associated with the second network 14 at a fixed distance. To prioritize connecting to the AP 10 using the second network 14, the device 102 may add a preference value to the second RSSI value when comparing the second RSSI value to the first RSSI value. For example, at location A the device 102 may determine the first RSSI value associated with the first network 12 to be −50 dBm and the second RSSI value associated with the second network 14 to be −60 dBm. However, the device 102 may add a fixed preference value (e.g., 20 dBm) to the second RSSI value to result in the RSSI value of −40 dBm illustrated in FIG. 7A. Therefore, FIG. 7A illustrates RSSI values associated with the second network 14 as including the preference value.

While FIG. 7A illustrates network characteristics associated with the first network 12 and the second network 14 at each of location A, location B and location C, this is intended for illustrative purposes only and the device 102 may not detect the network characteristics associated with each available network at each of the locations. For example, when the device 102 is connected to the first network 12, typically the device 102 does not detect network characteristics associated with other available networks (e.g., second network 14) until a roaming event is triggered. However, the present disclosure is not limited thereto.

The device 102 may travel on a first path 710 towards the AP 10 and may determine to connect to the first network 12 at location C. For example, the device 102 may determine that a signal quality metric value associated with the first network 12 is the strongest available signal at location C and may connect to the first network 12. In addition, the device 102 may store the signal quality metric value as the metric marker. When the device 102 travels along a second path 712 towards the AP 10, the device 102 may monitor the signal quality metric associated with the first network 12 and determine that the device 102 is closer to the AP 10 than location C when a signal quality metric value exceeds the metric marker. The device 102 may trigger a roaming event when the signal quality metric value associated with the first network 12 exceeds the previous metric marker and, if the device 102 determines that a current signal quality metric value associated with the first network 12 remains the highest signal quality metric of available networks, the device 102 may update the metric marker using the current signal quality metric value.

For example, the device 102 may travel along the first path 710 from outside a range of the first network 12 and may detect network characteristics 702 at location C. Based on the network characteristics 702, the device 102 may determine that the RSSI value associated with the first network 12 (e.g., −60 dBm) is the strongest available signal and may connect to the first network 12. After connecting to the first network 12, the device 102 may store the RSSI value (e.g., −60 dBm) as the metric marker for future comparisons. In this example, the device 102 may monitor a signal strength associated with the first network 12 and compare the signal strength to the metric marker to determine if the device 102 is closer to the AP 10 than location C, at which point the device 102 may trigger a roaming event to determine if additional networks are available.

As the device 102 travels along the second path 712 towards the AP 10, the device 102 may monitor the RSSI value associated with the first network 12 and compare the RSSI value to the metric marker to determine if a signal strength associated with the first network 12 improves above the metric marker. When the RSSI value associated with the first network 12 exceeds the metric marker (e.g., −60 dBm), the device 102 may trigger a roaming event and detect network characteristics. For example, at location B the device 102 may determine that the RSSI value associated with the first network 12 (e.g., −55 dBm) exceeds the metric marker (e.g., −60 dBm) stored from location C. Therefore, the device 102 may trigger a roaming event to determine available network(s) and may detect network characteristics 704. However, based on the network characteristics 704 the device 102 may determine that the RSSI value associated with the first network 12 (e.g., −55 dBm) exceeds the RSSI value associated with available networks (e.g., −70 dBm) and remain connected to the first network 12. As the device 102 remains connected to the first network 12, the device 102 may update the metric marker with the RSSI value associated with the first network 12 (e.g., −55 dBm).

At location A, the device 102 may be within range of both the first network 12 and the second network 14 and may determine that the RSSI value associated with the first network 12 (e.g., −50 dBm) exceeds the metric marker (e.g., −55 dBm) stored from location B. The device 102 may trigger another roaming event, detect network characteristics 606 and determine that the RSSI value associated with the second network 14 (e.g., −40 dBm) exceeds the RSSI value associated with the first network 12 (e.g., −50 dBm). Therefore, the device 102 may connect to the second network 14.

For ease of explanation, FIG. 7A illustrates the device 102 traveling linearly toward the AP 10 along the second path 712. Therefore, the device 102 may continue to trigger a roaming event and update the metric marker associated with the first network 12 as the device 102 travels closer to the AP 10. However, the device 102 may instead travel towards the AP 10 in a non-linear fashion without departing from the disclosure. For example, the device 102 may travel towards the AP 10 along a third path 714, traveling toward the AP 10 at a first time, traveling away from the AP 10 at a second time and traveling toward the AP 10 at a third time. As the device 102 travels towards the AP 10 at the first time, the device 102 may trigger roaming events and update the metric marker associated with the first network 12. As the device 102 travels away from the AP 10 at the second time, the device 102 may remain connected to the first network 12 without triggering a roaming event, as the signal quality metric associated with the first network 12 is below the updated metric marker. When the device 102 travels towards the AP 10 at the third time, the device 102 may remain connected to the first network 12 without triggering a roaming event until the signal quality metric associated with the first network 12 exceeds the metric marker. Therefore, the device 102 may store and update the metric marker as an indication of a previously closest distance between the device 102 and the AP 10.

FIG. 7B is a flowchart conceptually illustrating an example method for storing and updating a signal quality marker according to embodiments of the present disclosure.

As illustrated in FIG. 7B, the device 102 may connect (510) to a first network, determine (512) a first signal quality metric value of the first network, store (514) the first signal quality metric value as the metric marker, determine (516) a second signal quality metric value of the first network and determine (518) that the second signal quality metric value exceeds the metric marker as discussed above with regard to FIG. 5.

Thereafter, the device 102 may determine (720) network(s) available, may determine (722) signal quality metric values of the network(s) and determine (724) that the second signal quality metric value of the first network is the strongest signal quality metric value available of the available networks. Therefore, the device 102 may store (726) the second signal quality metric value as the metric marker and may remain (728) connected to the first network.

Figure 8A:
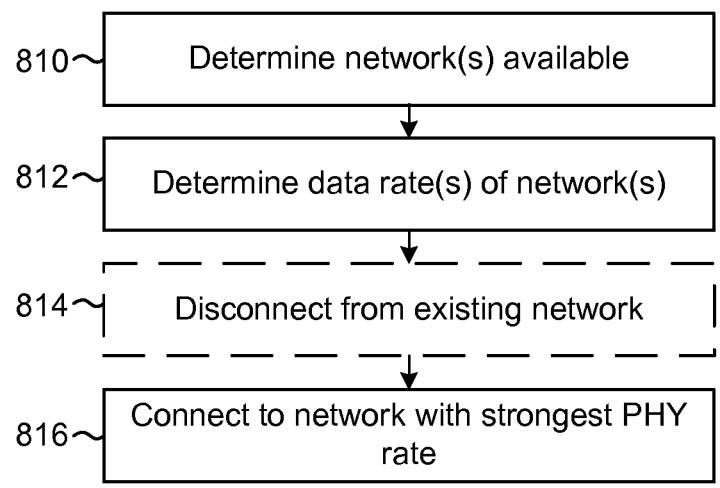
FIGS. 8A-8C are flowcharts conceptually illustrating example methods for connecting to networks and triggering roaming events using data rates according to embodiments of the present disclosure.
Figure 8B:
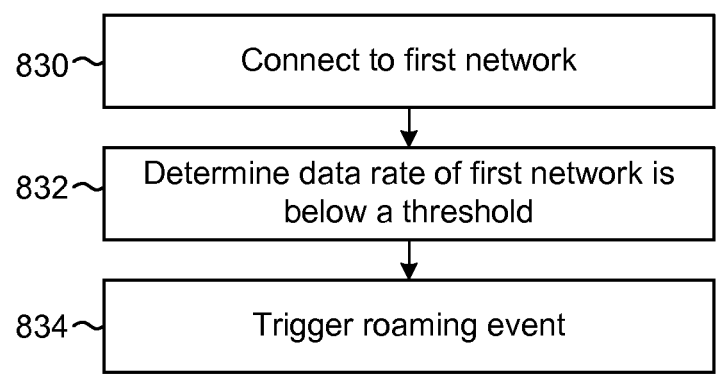
Figure 8C:
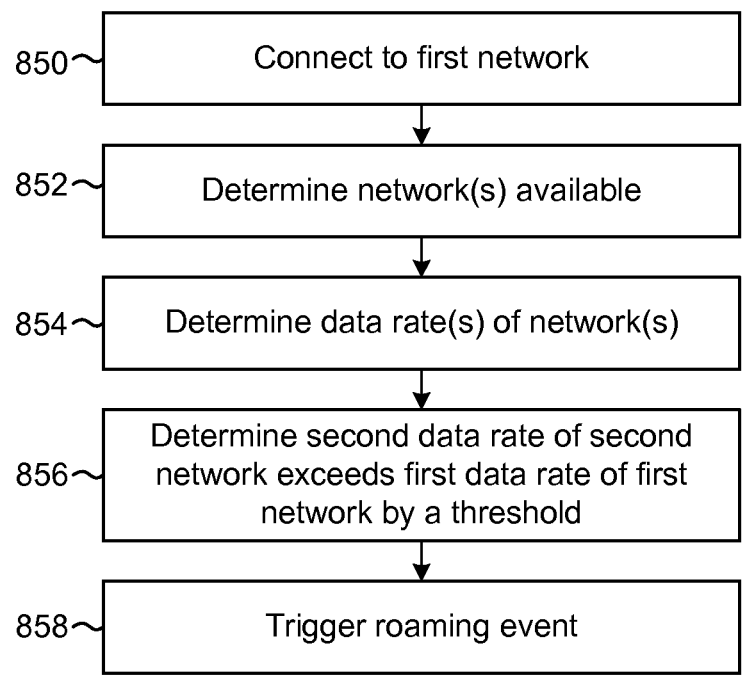

FIGS. 8A-8C are flowcharts conceptually illustrating example methods for connecting to networks and triggering roaming events using data rates according to embodiments of the present disclosure. While similar to the flowcharts illustrated in FIGS. 2A-2C, the flowcharts illustrated in FIGS. 8A-8C determine data rates instead of using signal strengths (e.g., RSSI values). Thus, the device 102 does not determine whether to connect to a network solely based on signal strength data (e.g., current RSSI values, an average RSSI value, Signal to Noise Ratio (SNR) or the like) as in current roaming algorithms, but instead determines whether to connect to a network based on data rates, such as throughput rates or a physical layer (PHY) data rate determined using signal quality metrics. Prior to connecting to a network, the device 102 may determine an estimated data rate (e.g., expected throughput) based on assumptions associated with the hardware capabilities of the AP 10 and the device 102. After connecting to the network, the device 102 may replace the estimated data rate with an actual data rate (e.g., actual throughput) determined based on data rates measured by the device 102.

As illustrated in FIG. 8A, a device 102 may determine (810) network(s) available, determine (812) data rate(s) (e.g., throughput rates, PHY rates or the like) of the available network(s), may optionally disconnect (814) from an existing network and may connect (816) to a network with a strongest data rate of the network(s). Thus, the device 102 chooses between the available networks based on data rates instead of signal strength (e.g., RSSI value).

Further, as illustrated in FIG. 8B, the device 102 may trigger a roaming event using roaming algorithms based on a data rates of a network with which the device is currently connected. For example, the device 102 may connect (830) to a first network, determine (832) a data rate associated with the first network is below a threshold and may trigger (834) a roaming event.

In some examples, the device 102 may only determine network(s) available and data rate(s) of the available network(s) during a roaming event. For example, when the device 102 is connected to the first network 12, the device 102 may not detect network characteristics associated with other available networks (e.g., second network 14) until a roaming event is triggered. However, the present disclosure is not limited thereto. Alternatively, as illustrated in FIG. 8C, the device 102 may connect (850) to a first network, determine (852) network(s) available, determine (854) data rate(s) of the available network(s), determine (856) that a second data rate of a second network exceeds a first data rate associated with the first network by a threshold and may trigger (858) a roaming event.

Figure 9:
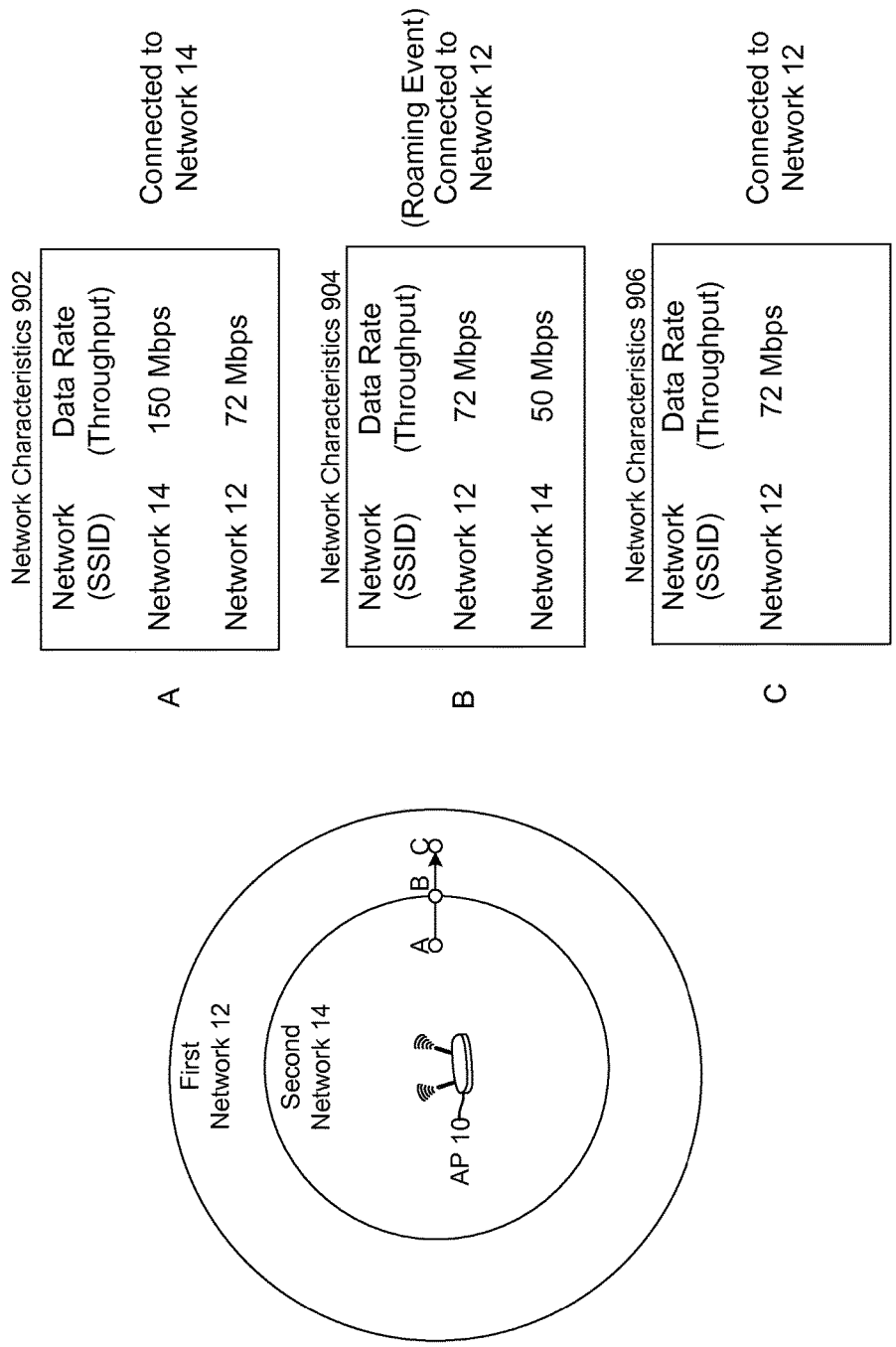
FIG. 9 illustrates an example of a device triggering a roaming event while traveling away from an access point according to embodiments of the present disclosure.

FIG. 9 illustrates an example of a device triggering a roaming event while traveling away from an access point according to embodiments of the present disclosure. While FIG. 9 illustrates network characteristics associated with the first network 12 and the second network 14 at each of location A, location B and location C, this is intended for illustrative purposes only and the device 102 may not detect the network characteristics associated with each available network at each of the locations. For example, when the device 102 is connected to the second network 14, typically the device 102 does not detect network characteristics associated with other available networks (e.g., first network 12) until a roaming event is triggered.

At a first location A within range of the first network 12 and the second network 14, the device may detect network characteristics 902. As illustrated in FIG. 9, the network characteristics 902 may include a network (e.g., service set identifier (SSID)) and a data rate (e.g., throughput rate, PHY rate or the like). The throughput rate is the data rate at which the device 102 actually communicates with the AP 10, and may be monitored using both the transmit (Tx) and receive (Rx) data paths. The throughput rate may be determined using current data rates, average data rates, based on a physical layer (PHY) data rate, which is a maximum data rate at which the device 102 and the AP 10 may communicate, or the like. As a data rate associated with the second network 14 (e.g., 150 Megabits per second (Mbps)) is higher than a data rate associated with the first network 12 (e.g., 72 Mbps), the device may connect to the second network 14.

However, a data rate associated with the second network 14 may fade as the device travels away from the AP 10. For example, the device 102 may detect that a data rate associated with the second network 14 (e.g., 50 Mbps) is below a threshold at a second location B. Therefore, the device 102 may trigger a roaming event and may detect network characteristics 904. Based on the network characteristics 904, the device 102 may determine to connect to the first network 12, which has a strongest data rate (e.g., 72 Mbps) of available networks. As the device travels further away from the AP 10, a signal strength associated with the second network 14 may fade such so that the device may not detect the second network 14 and the data rate associated with the second network 14 may be effectively ignored. For example, network characteristics 906 illustrates data rates associated with available networks at a third location C outside the range of the second network 14.

Figure 10:
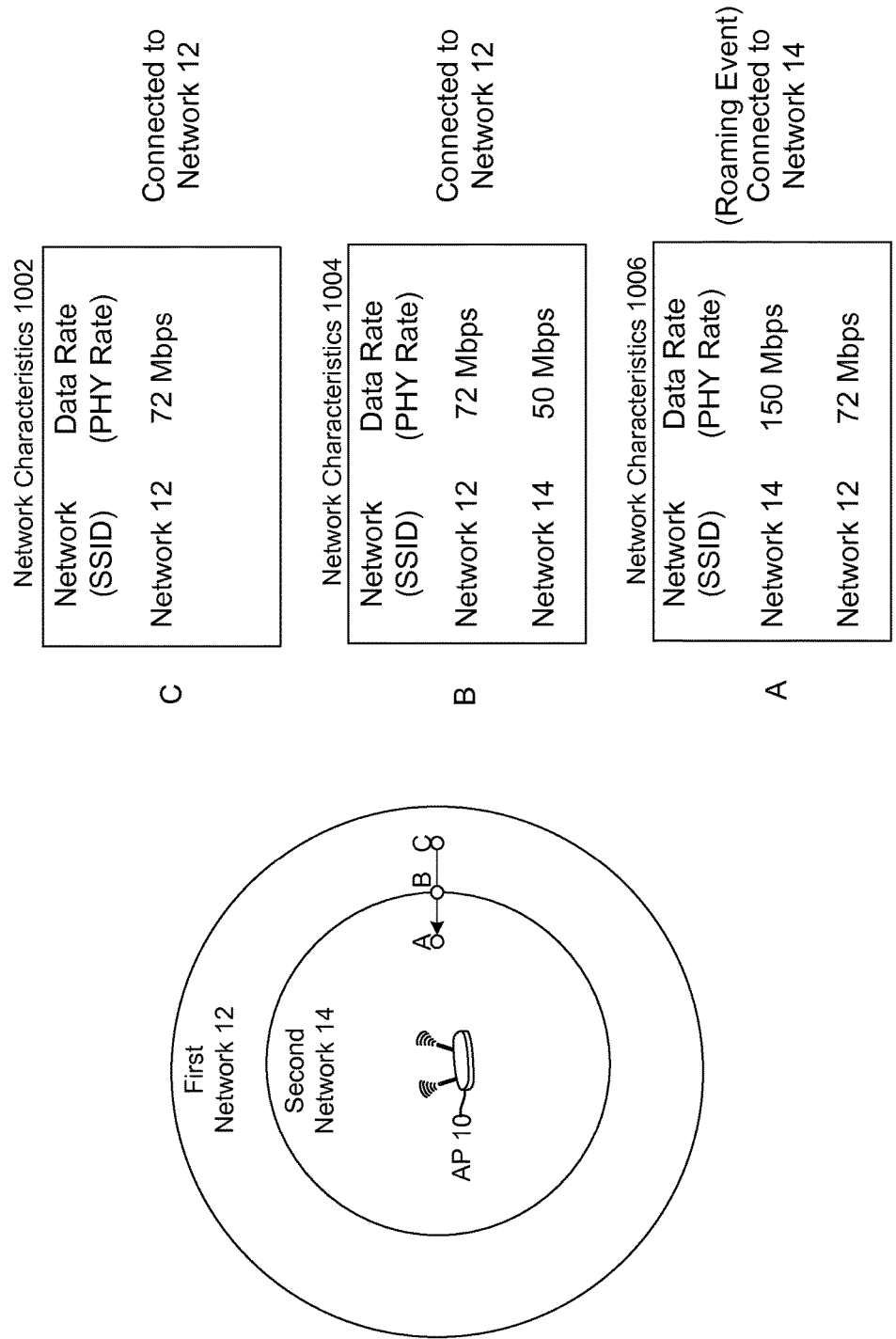
FIG. 10 illustrates an example of a device triggering a roaming event while traveling towards an access point according to embodiments of the present disclosure.

FIG. 10 illustrates an example of a device triggering a roaming event while traveling towards an access point according to embodiments of the present disclosure. While FIG. 10 illustrates network characteristics associated with the first network 12 and the second network 14 at each of location A, location B and location C, this is intended for illustrative purposes only and the device 102 may not detect the network characteristics associated with each available network at each of the locations. For example, when the device 102 is connected to the first network 12, typically the device 102 does not detect network characteristics associated with other available networks (e.g., second network 14) until a roaming event is triggered.

For example, at a first location C outside a range of the second network 14, the device 102 may detect network characteristics 1002 and may connect to the first network 12 as the first network 12 has a strongest data rate (e.g., 72 Mbps) of available networks. As the device 102 travels towards the AP 10, the device 102 may trigger a roaming event as discussed above with regard to FIG. 5-7B. For example, at a second location B the device 102 may determine that a signal quality metric associated with the first network 12 exceeds a metric marker and may detect network characteristics 1004. Based on the network characteristics 1004, the device 102 may determine that a data rate associated with the first network 12 (e.g., 72 Mbps) exceeds a data rate associated with the second network 14 (e.g., 50 Mbps) and remain connected to the first network 12.

However, at a third location A, the device 102 may be within range of both the first network 12 and the second network 14. Thus, the device 102 may determine that a signal quality metric associated with the first network 12 exceeds the metric marker and may trigger a roaming event to determine available network(s) and data rates associated with the available network(s). Thus, the device 102 may detect network characteristics 1006 and determine that a second data rate associated with the second network 14 (e.g., 150 Mbps) exceeds a first data rate associated with the first network 12 (e.g., 72 Mbps). Therefore, the device 102 may determine that the second network 14 has the highest data rate (e.g., 150 Mbps) and may connect to the second network 14.

In addition to triggering a roaming event using the techniques illustrated in FIGS. 8B-8C, the device 102 may trigger a roaming event using additional techniques. For example, FIGS. 11A-11B are flowcharts conceptually illustrating example methods for triggering roaming events according to embodiments of the present disclosure.

Figure 11A:
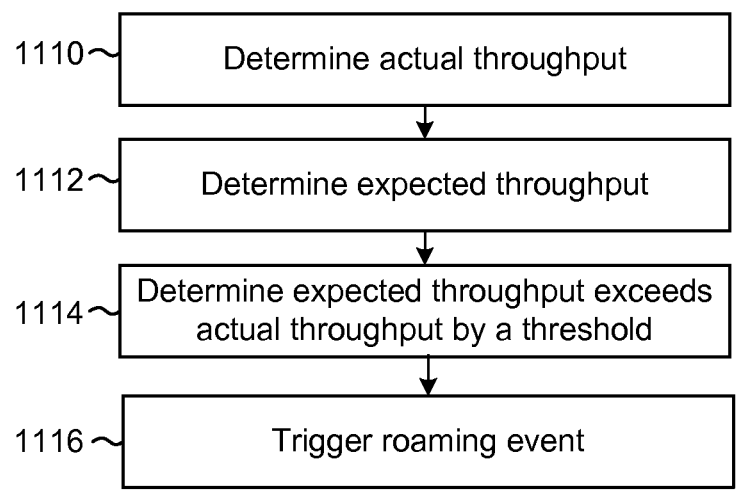
FIGS. 11A-11B are flowcharts conceptually illustrating example methods for triggering roaming events according to embodiments of the present disclosure.

As illustrated in FIG. 11A, after the device 102 connects to a network the device 102 may determine (1110) an actual throughput of the network connection, determine (1112) an expected throughput of the network connection, determine (1114) that the expected throughput exceeds the actual throughput by a threshold and may trigger (1116) a roaming event. For example, the device 102 may determine the actual throughput of the network connection using techniques discussed in greater detail below with regard to FIGS. 12A-12B and may determine the expected throughput of the network connection using techniques discussed in greater detail below with regard to FIGS. 13A-13B, although the disclosure is not limited thereto. If the estimated throughput exceeds the actual throughput by more than the threshold, the device 102 may trigger a roaming event, which is discussed in greater detail above with regard to FIG. 8A.

Figure 11B:
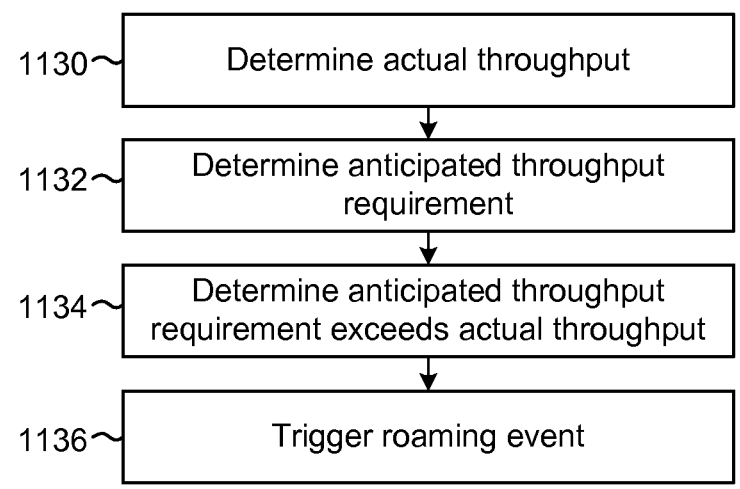

As illustrated in FIG. 11B, after the device 102 connects to a network the device 102 may determine (1130) an actual throughput of the network connection, determine (1132) an anticipated throughput requirement of the network connection, determine (1134) that the anticipated throughput requirement exceeds the actual throughput and may trigger (1136) a roaming event. The device 102 may determine the actual throughput of the network connection using techniques discussed in greater detail below with regard to FIGS. 12A-12B, although the disclosure is not limited thereto. The device 102 may determine the anticipated throughput requirement based on application(s) running on the device 102. For example, the device 102 may determine prior throughput consumption (e.g., data throughput) for individual application(s) and determine which application(s) are currently running on the device 102. Thus, if a user of the device 102 opens a new application, the device 102 may anticipate the additional throughput consumption and trigger a roaming event if the anticipated throughput requirement exceeds the actual throughput available to the device 102.

Figure 12A:
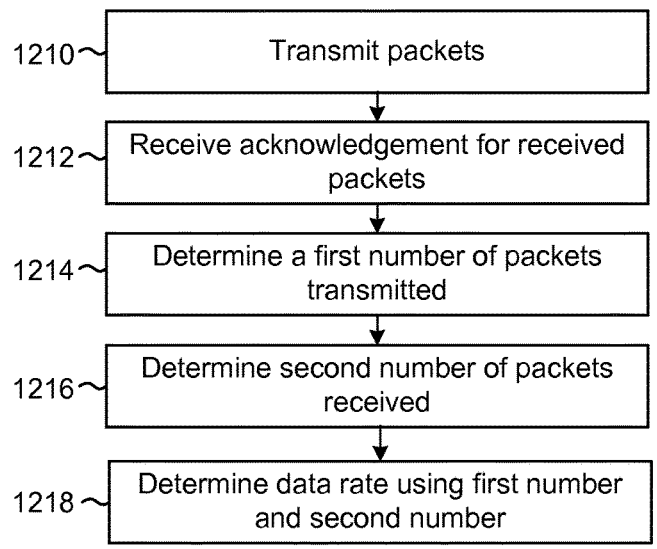
FIGS. 12A-12B are flowcharts conceptually illustrating example methods for determining data rates according to embodiments of the present disclosure.
Figure 12B:
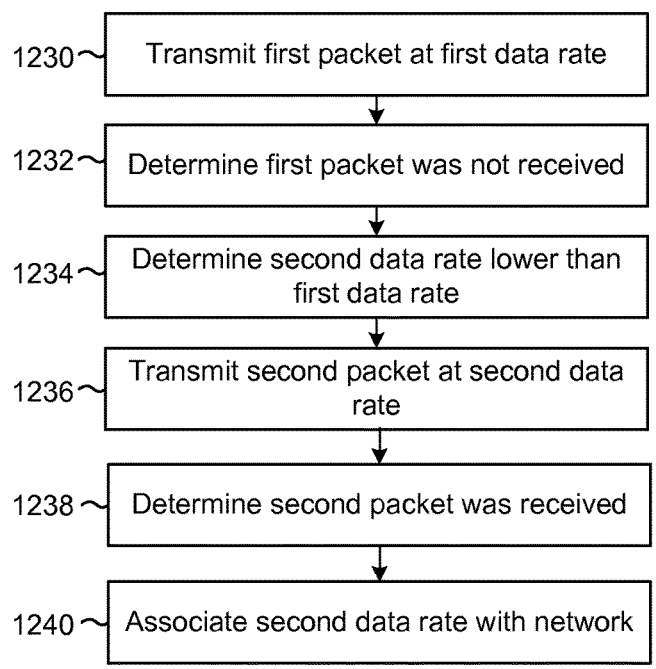

The device 102 may determine the actual bandwidth (e.g., current data rates) of the network using techniques discussed with regard to FIGS. 12A-12B. For example, FIGS. 12A-12B are flowcharts conceptually illustrating example methods for determining data rates according to embodiments of the present disclosure.

As illustrated in FIG. 12A, the device 102 may transmit (1210) data packets to the network, may receive (1212) an acknowledgment for received data packets, may determine (1214) a first number of data packets transmitted to the network during the connection and may determine (1216) a second number of data packets received by the network during the connection. For example, the device 102 may transmit a first data packet and a second data packet to the AP 10 and receive an acknowledgement from the AP 10 that the first data packet was received. As the device 102 did not receive an acknowledgment from the AP 10 that the second data packet was received, the device 102 may determine that the first number of transmitted data packets was two and the second number of received data packets was one. The device may then determine (1218) a data rate using the first number of transmitted data packets and the second number of received data packets. For example, the device 102 may use first signal quality metrics (e.g., TX frame count, TX rate, TX rate history or the like) available to the device 102 to determine the first number of data packets, may use second signal quality metrics (e.g., RX frame count, RX rate, RX rate history or the like) received from the AP 10 to determine the second number of data packets, and may determine the data rate using the first signal quality metrics and the second signal quality metrics. The data rate may be the physical layer rate (PHY rate), which is the maximum data rate at which the device 102 may communicate with the AP 10, or may be the throughput rate, which is the actual data rate at which the device 102 communicates with the AP 10, although the disclosure is not limited thereto and the data rate may be application layer rate or the like without departing from the disclosure.

As illustrated in FIG. 12B, the device 102 may transmit (1230) a first data packet at a first data rate to the network and may determine (1232) that the first data packet was not received (for example by not receiving an acknowledgement (ACK) message, through receipt of a Negative Acknowledgement (NACK) message or the like). The device 102 may then determine (1234) a second data rate lower than the first data rate, transmit a second data packet at the second data rate to the network and determine (1238) that the second data packet was received (for example through receipt of an Acknowledgement (ACK) message or the like). Based on this, the device 102 may associate (1240) the second data rate with the network. For example, the device 102 may begin transmitting a data packet at a maximum data rate and may incrementally reduce the transmitted data rate until the AP 10 receives the data packet successfully. The data rate at which the AP 10 receives the data packet successfully may be used as the data rate associated with the AP 10. If the AP 10 receives data packets successfully at different data rates, the device 102 may associate the AP 10 with the lowest data rate or with an average of the data rates or the like.

Figure 13A:
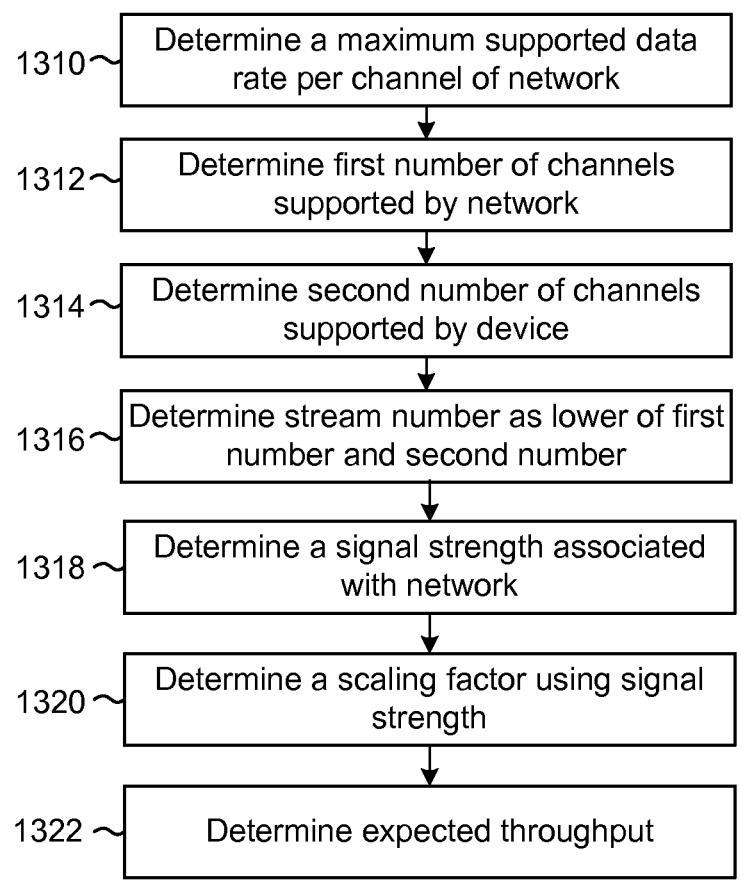
FIGS. 13A-13B are flowcharts conceptually illustrating example methods for determining an expected throughput and an actual throughput according to embodiments of the present disclosure.
Figure 13B:
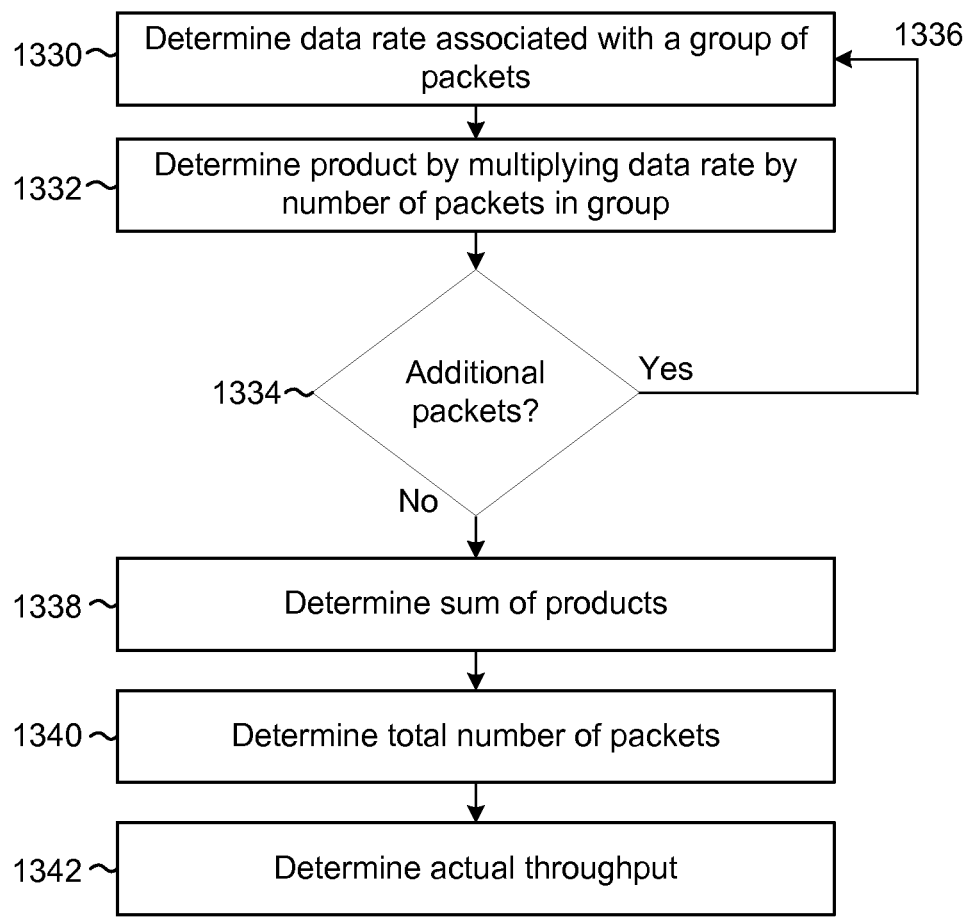

The device 102 may determine the expected throughput (e.g., estimated data rate supported by both the device 102 and the AP 10) and/or the actual throughput (e.g., actual data rate transmitted between the device 102 and the AP 10) of the network using techniques discussed with regard to FIGS. 13A-13B. For example, FIGS. 13A-13B are flowcharts conceptually illustrating example methods for determining an expected throughput and/or an actual throughput according to embodiments of the present disclosure. Prior to connecting to a network, the device 102 may determine an estimated data rate (e.g., expected throughput) based on assumptions associated with the hardware capabilities of the AP 10 and the device 102, a RSSI or the like. After connecting to the network, the device 102 may replace the estimated data rate with an actual data rate (e.g., actual throughput) determined based on data rates measured by the device 102.

As illustrated in FIG. 13A, the device 102 may determine (1310) a maximum supported data rate (PHYRate_Max) per channel of the network. For example, the device 102 may determine the maximum supported data rate using a lookup table based on characteristics of the AP 10, such as a channel width and guard interval. An example of a lookup table is provided in Table 1.

The device 102 may determine (1312) a first number of channels supported by the network, may determine (1314) a second number of channels supported by the device 102 and may determine (1316) a stream number (SS_Num) as the lower of the first number and the second number. For example, the device 102 may receive a first channel number indicating a maximum number of channels supported by the AP 10 from the AP 10, may determine a second channel number indicating a maximum number of channels supported by the device 102 and may take the lower of the first channel number and the second channel number as the stream number, indicating the number of channels that will be used between the device 102 and the AP 10.

The device 102 may determine (1318) a signal strength (e.g., RSSI value) associated with the network and may determine (1320) a scaling factor (RSSILvlFactor) using the signal strength. For example, the scaling factor (RSSILvlFactor) may scale the advertised data rate (PHYRate_Max) to a more realistic value using a lookup table. An example of a lookup table is provided in Table 2.

TABLE 2

| RSSI Level | d Bm Range | Scaling Factor |
|---|---|---|
| High | >=−60 dBm | 0.7 |
| Medium | <−60 dBm & >−70 dBm | 0.6 |
| Low | <=−70 dBm | 0.5 |

The device 102 may then determine (1322) an expected throughput (Exp_Thrpt). For example, the device 102 may determine the expected throughput using the maximum supported data rate (PHYRate_Max), the stream number (SS_Num) and the scaling factor (RSSILvlFactor) using equation 1:

$$\text{Exp\_Thrpt} = \text{RSSILvlFactor} * \text{PhyRate\_Max} * SS\_N \quad (1)$$

After the initial connection, the expected throughput may be updated periodically using an actual throughput. For example, the device 102 may determine how many data packets are transmitted and the data rate associated with each of the transmitted data packets. Thus, the device 102 may determine the actual throughput per spatial stream (e.g.,

TABLE 1

Example of 11ac PHY Rates for a Single Spatial Stream

| MCS | Modulation Type | Coding rate | 20 MHz channels | | 40 MHz channels | | 80 MHz channels | | 160 MHz | |
|---|---|---|---|---|---|---|---|---|---|---|
| | | | 800 ns GI | 400 ns GI | 800 ns GI | 400 ns GI | 800 ns GI | 400 ns GI | 800 ns GI | 400 ns GI |
| 0 | BPSK | ½ | 6.5 | 7.2 | 13.5 | 15 | 29.3 | 32.5 | 58.5 | 65 |
| 1 | QPSK | ½ | 13 | 14.4 | 27 | 30 | 58.5 | 65 | 117 | 130 |
| 2 | QPSK | ¾ | 19.5 | 21.7 | 40.5 | 45 | 87.8 | 97.5 | 175.5 | 195 |
| 3 | 16-QAM | ½ | 26 | 28.9 | 54 | 60 | 117 | 130 | 234 | 260 |
| 4 | 16-QAM | ¾ | 39 | 43.3 | 81 | 90 | 175.5 | 195 | 351 | 390 |
| 5 | 64-QAM | ⅔ | 52 | 57.8 | 108 | 120 | 234 | 260 | 468 | 520 |
| 6 | 64-QAM | ¾ | 58.5 | 65 | 121.5 | 135 | 263.3 | 292.5 | 526.5 | 585 |
| 7 | 64-QAM | ⅚ | 65 | 72.2 | 135 | 150 | 292.5 | 325 | 585 | 650 |
| 8 | 256-QAM | ¾ | 78 | 86.7 | 162 | 180 | 351 | 390 | 702 | 780 |
| 9 | 256-QAM | ⅚ | N/A | N/A | 180 | 200 | 390 | 433.3 | 780 | 866.7 | channel) using equation 2 and determine the actual throughput using equation 3, which are described in greater detail with regard to FIG. 13B.

$$Act\_Thrpt\_SS = (\Sigma PhyRate\_n * NumPck\_n) / NumPck\_total \quad (2)$$

$$Act\_Thrpt = \Sigma Act\_Thrpt\_SS\_n \quad (3)$$

As illustrated in FIG. 13B, the device 102 may determine (1330) a data rate (PhyRate_n) associated with a group of data packets and may determine (1332) a product by multiplying the data rate by the number of data packets (NumPck_n) in the group. The device 102 may then determine (1334) if the device 102 transmitted additional data packets and may loop (1336) and repeat steps 1330-1332 for the additional data packets. If the device 102 determines that there are no additional data packets, the device 102 may determine (1338) a sum of the products. For example, the device 102 may determine a first number of data packets transmitted at a first data rate and a second number of data packets transmitted at a second data rate. The device 102 may multiply the first number of data packets by the first data rate to generate a first product and multiply the second number of data packets by the second data rate to generate a second product. The device 102 may then sum the first product and the second product.

The device 102 may determine (1340) a total number of data packets transmitted (NumPck_total). For example, the device 102 may sum the first number of data packets and the second number of data packets. The device 102 may then determine (1342) a actual throughput (Act_Thrpt). For example, the device 102 may determine the actual throughput per spatial stream (Act_Thrpt_SS) using the scaling factor (RSSILvlFactor), the individual data rates (PhyRate_n), the individual number of data packets (NumPck_n) and the total number of data packets transmitted (NumPck_total) and equation 2. The device 102 may then determine the actual throughput by summing the actual throughput per spatial stream for each spatial stream.

Based on the actual throughput (e.g., current data rates) of the network and the expected throughput (e.g., estimated data rates supported by both the device 102 and the AP 10), the device 102 may trigger a roaming event using various techniques, as discussed above with regard to FIG. 11A. As an example, when the actual throughput falls below an expected throughput for a specific signal strength (e.g., RSSI value), the device 102 may trigger a roaming event. For example, at a signal strength of −55 dBm the expected throughput may be 200 Mbps for a 2 spatial stream 802.11 ac network device on a 40 MHz channel. If the actual throughput is calculated at 75 Mbps, the device 102 may trigger a roaming event as there may be many retransmissions and/or CRC errors that cause the lower data rate to be selected more often.

Figure 14:
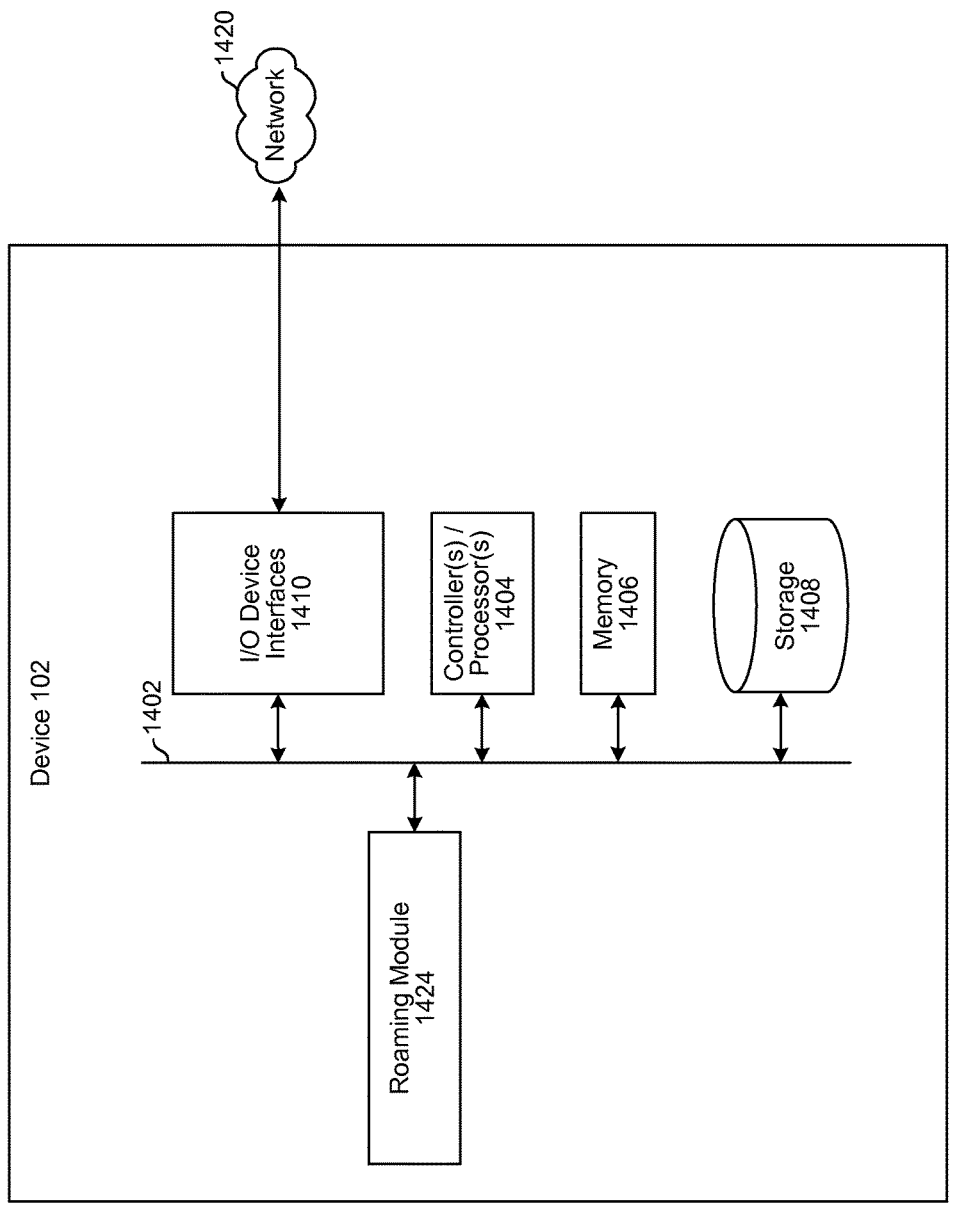
FIG. 14 is a block diagram conceptually illustrating example components of a system according to embodiments of the present disclosure.

FIG. 14 illustrates a block diagram conceptually illustrating example components of a system 100 according to the present embodiments. In operation, the system 100 may include computer-readable and computer-executable instructions that reside in storage 1408 on the device 102. The device 102 may be an electronic device capable of connecting to a wireless network. Examples of electronic devices may include computers (e.g., a desktop, a laptop, a server or the like), portable devices (e.g., a camera, smart phone, tablet or the like), media devices (e.g., televisions, video game consoles or the like) or the like. The device 102 may also be a component of any of the abovementioned devices or systems.

As illustrated in FIG. 14, the device 102 may include an address/data bus 1402 for conveying data among components of the device 102. Each component within the device 102 may also be directly connected to other components in addition to (or instead of) being connected to other components across the bus 1402.

The device 102 may include one or more controllers/processors 1404 comprising one-or-more central processing units (CPUs) for processing data and computer-readable instructions and a memory 1406 for storing data and instructions. The memory 1406 may include volatile random access memory (RAM), non-volatile read only memory (ROM), non-volatile magnetoresistive (MRAM) and/or other types of memory. The device 102 may also include a data storage component 1408 for storing data and processor-executable instructions. The data storage component 1408 may include one or more non-volatile storage types such as magnetic storage, optical storage, solid-state storage, etc. The device 102 may also be connected to a removable or external non-volatile memory and/or storage (such as a removable memory card, memory key drive, networked storage, etc.) through the input/output device interfaces 1410.

The device 102 includes input/output device interfaces 1410. The input/output device interfaces 1410 may be configured to operate with a network 1420, for example a wireless local area network (WLAN) (such as WiFi), Bluetooth, zigbee and/or wireless networks, such as a Long Term Evolution (LTE) network, WiMAX network, 3G network, etc. The network 1420 may include a local or private network or may include a wide network such as the internet. Devices may be connected to the network 1420 through a wireless connection.

The input/output device interfaces 1410 may also include an interface for an external peripheral device connection such as universal serial bus (USB), FireWire, Thunderbolt, Ethernet port or other connection protocol that may connect to networks 1420.

The device 102 further includes a roaming module 1424, which may comprise processor-executable instructions stored in storage 1408 to be executed by controller(s)/processor(s) 1404 (e.g., software, firmware), hardware, or some combination thereof. For example, components of the roaming module 1424 may be part of a software application running in the foreground and/or background on the device 102. The roaming module 1424 may control the device 102 as discussed above, for example with regard to FIGS. 1A, 1B, 5, 7, 8A-8C, 11A-11B, 12A-12B and/or 13A-13B. Some or all of the controllers/modules of the roaming module 1424 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable computer instructions for operating the device 102 and its various components may be executed by the controller(s)/processor(s) 1404, using the memory 1406 as temporary "working" storage at runtime. The executable instructions may be stored in a non-transitory manner in non-volatile memory 1406, storage 1408, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   connecting, by a device at a first distance relative to a wireless local area network (WLAN) access point, to the WLAN access point via a first communication link using a 5 GHz frequency band;
   determining, by the device at the first distance, a first signal strength value associated with the first communication link;
   determining, by the device at a second distance relative to the WLAN access point, a second signal strength value associated with the first communication link, wherein the second distance is greater than the first distance;
   determining, by the device at the second distance, the second signal strength value is below a threshold value;
   detecting, by the device at the second distance, a third signal strength value associated with a 2.4 GHz frequency band;
   determining, by the device, that the third signal strength value exceeds the threshold value;
   terminating, by the device, the first communication link;
   connecting, by the device, to the WLAN access point via a second communication link using the 2.4 GHz frequency band;
   storing, by the device, the third signal strength value;
   determining, by the device at a third distance relative to the WLAN access point, a fourth signal strength value associated with the second communication link, wherein the third distance is less than the second distance and greater than the first distance;
   determining, by the device, the fourth signal strength value exceeds the third signal strength value;
   determining, by the device at the third distance, that a signal from the WLAN access point on the 5 GHz frequency band has a signal strength value that exceeds the threshold value;
   terminating, by the device, the second communication link; and
   connecting, by the device, to the WLAN access point via a third communication link using the 5 GHz frequency band.

2. The computer-implemented method of claim 1, further comprising:
   determining, by the device at a fourth distance relative to the WLAN access point and prior to determining the fourth signal strength value, a fifth signal strength value associated with the second communication link, wherein the fourth distance is less than the second distance and greater than the third distance;
   determining, by the device, the fifth signal strength value executes the third signal strength value;
   determining, by the device at the fourth distance, that a signal on the 5 GHz frequency band is associated with a signal strength value below the threshold value;

deleting, by the device, the third signal strength value; and storing the fifth signal strength value.

3. The computer-implemented method of claim 1, further comprising:
determining, by the device at the second distance, a first data packet error rate associated with the second communication link;
determining, by the device at the third distance, a second data packet error rate associated with the second communication link; and
determining, by the device, that the second data packet error rate exceeds the first data packet error rate.

4. The computer-implemented method of claim 1, further comprising:
determining, by the device at the second distance, a first data rate associated with the second communication link;
determining, by the device at the third distance, a second data rate associated with the second communication link; and
determining, by the device, that the second data rate exceeds the first data rate.

5. A computer-implemented method, comprising:
connecting, by a device, to an access point using a first frequency;
determining, by the device at a first distance relative to the access point, a first signal quality metric associated with the first frequency;
determining, by the device at the first distance, a second signal quality metric associated with a second frequency;
determining a first difference between the first signal quality metric and the second signal quality metric;
determining, by the device at a second distance relative to the access point, a third signal quality metric associated with the first frequency, wherein the second distance is less than the first distance;
determining a second difference between the first signal quality metric and the third signal quality metric;
determining the second difference is greater than the first difference; and
connecting, by the device, to the access point using the second frequency.

6. The computer-implemented method of claim 5, further comprising:
determining, by the device at a third distance relative to the access point, a fourth signal quality metric associated with the first frequency, wherein the third distance is less than the first distance and greater than the second distance;
determining a third difference between the first signal quality metric and the fourth signal quality metric; and
determining the third difference is greater than the first difference,
wherein connecting to the access point using the second frequency is based at least in part on the third difference being greater than the first difference.

7. The computer-implemented method of claim 5, further comprising:
prior to connecting to the access point using the first frequency, connecting to the access point using the second frequency;
determining, by the device at the first distance, that a fourth signal quality metric associated with the second frequency is below a threshold; and
determining to connect to the access point using the first frequency.

8. The computer-implemented method of claim 5, wherein:
the first signal quality metric is a data rate associated with the first frequency; and
determining the first signal quality metric further comprises:
determining a first number of data packets transmitted by the device within a first period of time;
determining a second number of data packets received by the access point during the first period of time; and
determining the data rate using the first number and the second number.

9. The computer-implemented method of claim 5, wherein the first signal quality metric is a first signal strength value associated with the first frequency.

10. The computer-implemented method of claim 9, further comprising:
determining an actual throughput associated with the first frequency;
determining an expected throughput based on the first signal strength value; and
determining that the actual throughput is below the expected throughput,
wherein connecting to the access point using the second frequency is based at least in part on the actual throughput being below the expected throughput.

11. The computer-implemented method of claim 5, wherein the first signal quality metric is one of a data packet error rate, bit error rate, signal to noise ratio, retries count, multiple retries count, transmission frame count, transmission frame queued count, transmission byte count, transmission byte queued count, transmission rate, transmission rate history, Receive Success Rate (RTS) fail count, RTS success count, Acknowledgment (ACK) fail count, current Received Signal Strength Indicator (RSSI) value, average RSSI value, receive frame count, receive duplicated frame count, receive Cyclic Redundancy Check (CRC) error count, receive rate, or receive rate history.

12. The computer-implemented method of claim 5, wherein the first signal quality metric includes two or more of a data rate, a signal strength, a transmit error rate, and a retry counter.

13. A device, comprising:
at least one processor;
memory including instructions, that when executed by the at least one processor, cause the device to:
connect to an access point using a first frequency;
determine, at a first distance relative to the access point, a first number of data packets transmitted by the device within a period of time;
determine, at the first distance, a second number of data packets received by the access point during the period of time;
determine, at the first distance and based at least in part on the first number and the second number, a first signal quality metric associated with the first frequency;
determine, at a second distance relative to the access point, a second signal quality metric associated with the first frequency, wherein the second distance is less than the first distance;
determine the second signal quality metric exceeds the first signal quality metric; and
connect to the access point using a second frequency.

14. The device of claim 13, wherein the instructions, when executed by the at least one processor, further cause the device to:
- determine, at a third distance relative to the access point, a third signal quality metric associated with the first frequency, the third distance being less than the first distance but greater than the second distance;
- determine that the third signal quality metric is below a threshold;
- determine that the third signal quality metric exceeds the first signal quality metric;
- determine that the second signal quality metric exceeds the third signal quality metric; and
- connect to the access point using the second frequency based at least in part on the second signal quality metric exceeding the third signal quality metric.

15. The device of claim 13, wherein the instructions, when executed by the at least one processor, further cause the device to:
- prior to connecting to the access point using the first frequency, connect to the access point using the second frequency;
- determine, at the first distance, a third signal quality metric associated with the second frequency;
- determine that the third signal quality metric is below a threshold; and
- connect to the access point using the first frequency based at least in part on the third signal quality metric being below the threshold.

16. The device of claim 13, wherein the first signal quality metric is a first signal strength value associated with the first frequency.

17. The device of claim 16, wherein the instructions, when executed by the at least one processor, further cause the device to:
- determine an actual throughput associated with the first frequency;
- determine an expected throughput based on the first signal strength value;
- determine that the actual throughput is below the expected throughput; and
- connect to the access point using the second frequency based at least in part on the actual throughput being below the expected throughput.

18. The device of claim 13, wherein the first signal quality metric is one of a data packet error rate, bit error rate, signal to noise ratio, retries count, multiple retries count, transmission frame count, transmission frame queued count, transmission byte count, transmission byte queued count, transmission rate, transmission rate history, Receive Success Rate (RTS) fail count, RTS success count, Acknowledgment (ACK) fail count, current Received Signal Strength Indicator (RSSI) value, average RSSI value, receive frame count, receive duplicated frame count, receive Cyclic Redundancy Check (CRC) error count, receive rate, or receive rate history.

19. The device of claim 13, wherein the first signal quality metric includes two or more of a data rate, a signal strength value, a data packet error rate, and a retry counter.

* * * * *